US008885181B2

(12) United States Patent
Williams et al.

(10) Patent No.: US 8,885,181 B2
(45) Date of Patent: Nov. 11, 2014

(54) VIRTUAL PRESS RUN

(75) Inventors: Leon Williams, Walworth, NY (US);
Mark McCuen, Scottsdale, AZ (US)

(73) Assignee: Electronics for Imaging, Inc., Fremont, CA (US)

( * ) Notice: Subject to any disclaimer, the term of this patent is extended or adjusted under 35 U.S.C. 154(b) by 1072 days.

(21) Appl. No.: 12/722,064

(22) Filed: Mar. 11, 2010

(65) Prior Publication Data

US 2011/0035759 A1    Feb. 10, 2011

Related U.S. Application Data

(60) Provisional application No. 61/231,237, filed on Aug. 4, 2009.

(51) Int. Cl.
G06F 3/048      (2013.01)
G06F 17/21      (2006.01)
G06F 17/00      (2006.01)

(52) U.S. Cl.
CPC .................................... G06F 17/211 (2013.01)
USPC .......... 358/1.13; 258/1.9; 258/1.18; 258/537; 715/274; 715/273; 715/243; 715/782; 715/788; 715/835; 715/838; 715/848

(58) Field of Classification Search
CPC .............. G06F 17/00; G06F 17/30126; G06F 3/04815; G06F 17/211; G06T 19/00; G06T 19/20; H04N 1/00456; H04N 2013/04; H04N 2013/0465
USPC .......................... 358/1.1, 1.9, 2.1, 1.11–1.18; 715/761–771, 273–277; 719/311–328
See application file for complete search history.

(56) References Cited

U.S. PATENT DOCUMENTS

| 6,078,936 | A  | * | 6/2000 | Martin et al. ................. 715/201 |
| 6,509,974 | B1 |   | 1/2003 | Hansen |
| 2001/0051964 | A1 |   | 12/2001 | Warmus et al. |
| 2002/0040374 | A1 |   | 4/2002 | Kent |
| 2002/0046238 | A1 | * | 4/2002 | Estavillo et al. ............. 709/203 |
| 2003/0140315 | A1 | * | 7/2003 | Blumberg et al. ............ 715/527 |
| 2003/0142325 | A1 | * | 7/2003 | Leslie ............................ 358/1.1 |
| 2004/0190057 | A1 | * | 9/2004 | Takahashi et al. ........... 358/1.15 |
| 2005/0060650 | A1 |   | 3/2005 | Ryan et al. |
| 2006/0053370 | A1 |   | 3/2006 | Hitaka et al. |

(Continued)

FOREIGN PATENT DOCUMENTS

| CN | 1424669 | 6/2003 |
| CN | 101372185 | 2/2009 |
| EP | 1215877 | 6/2002 |
| EP | 1387289 | 2/2004 |
| WO | WO-2007110865 | 10/2007 |

OTHER PUBLICATIONS

Int'l Search Report and Written Opinion mailed Aug. 4, 2010 in related PCT application No. PCT/US2010/044439, 13 pages.

(Continued)

*Primary Examiner* — Chad Dickerson
(74) *Attorney, Agent, or Firm* — Michael A. Glenn; Perkins Coie LLP

(57) ABSTRACT

A computer architecture that integrates desktop productivity applications with various visualization engines and various output engines allowing visualization, modification and formatting of the ultimate output from the application. Methods for accomplishing content visualization, editing and formatting in light of one or more printing option are also provided.

40 Claims, 18 Drawing Sheets

(56) References Cited

U.S. PATENT DOCUMENTS

| | | | |
|---|---|---|---|
| 2006/0114490 A1* | 6/2006 | Rolleston | 358/1.14 |
| 2007/0229902 A1 | 10/2007 | Sato | |
| 2007/0240042 A1* | 10/2007 | Sato | 715/527 |
| 2008/0079963 A1 | 4/2008 | Matsubara | |
| 2008/0172302 A1 | 7/2008 | Knodt | |
| 2008/0197617 A1 | 8/2008 | Kobayashi | |
| 2008/0231886 A1 | 9/2008 | Wehner et al. | |
| 2008/0259395 A1 | 10/2008 | Mori | |
| 2009/0244584 A1 | 10/2009 | McGarry et al. | |
| 2009/0273806 A1 | 11/2009 | Nishikawa et al. | |

OTHER PUBLICATIONS

Parsons, J, "Planning for Print: ScenicSoft's UpFront", Seybold Report on Publishing Systems, Media, PA, U.S. vol. 30, No. 6. XP002243242, ISSN: 0736-7260., Nov. 27, 2000, 4 pages.

Simon, H, "Printing Industry Management and Automation", Esprit: Harland Simon PLC. XP002990620., Jun. 2002, 24 Pages.

* cited by examiner

VIRTUAL PRESS RUN

CROSS REFERENCE TO RELATED APPLICATIONS

This patent application claims the benefit of U.S. provisional patent application Ser. No. 61/231,237, Virtual Press Run, filed Aug. 4, 2009, the entirety of which is incorporated herein by this reference thereto.

BACKGROUND OF THE INVENTION

1. Technical Field

The invention relates to the field of content visualization, editing, formatting and printing. More specifically, the invention relates to computer architecture and user interface for providing a virtual press run thus achieving realistic document visualization and achieving a more robust set of editing and printing options.

2. Description of the Related Art

Electronic document production involves developing content, preparing a document layout and outputting the document, typically in the form of a print job. A number of computer applications provide the necessary tools to accomplish basic content preparation, but do not provide a user with the adequate resources to visualize, edit and format the content so that the visual preview of the document on a computer interface actually represents how a completed print job looks. Furthermore, existing publishing applications do not offer a user with adequate editing or formatting options for a print job.

Most content creation applications include a printing options interface and a print preview tool. However, the printing options interface does not adequately show the user how the selected options will affect the appearance and layout of the actual finished printed and optionally bound document. Likewise, the print preview tool oftentimes does not provide an acceptable representation of what the print job will actually look like. Present solutions to this problem include conducting multiple test runs or outsourcing document creation to a specialist, both of which are a waste of time and financial resources.

Furthermore, typical content production applications only offer a user a basic degree of customization for a print job. For example, common presentation creation applications allow a user to print multiple slides on a single page. However, these applications fall short when a user desires to vary how many slides are to appear on each page throughout the whole print job. Similarly, content creation applications do not provide a user with an easy way to rotate source media, change media size, or alter document folding options. In these situations the user is forced to choose between foregoing the desired degree of customization and creating multiple print jobs to achieve the desired goals.

Finally, most known document production applications do not provide a robust user interfaces for visualization, formatting and editing print jobs.

SUMMARY OF THE INVENTION

In view of the foregoing, the invention provides a computer architecture for integrating desktop productivity applications with various visualization engines and with various printer engines allowing robust visualization, modification and formatting of the ultimate output from the application. The invention also discloses methods for accomplishing robust visualization, modification and formatting in a computing environment.

The invention is implemented with a computer architecture having a publishing module to gather editing tools, visualizations engines, print enhancement tools, and printing capability protocols as well as editable and printable content from any number of content sources. The publishing module merges the various gathered data and presents a user with visualization, modification and formatting tools through a graphical user interface, such that the user can see precisely how the ultimate output will appear on one or more networked printers. In some embodiments of the invention, the publishing module updates the visualization of the print job as the user changes various printing options.

The invention also provides novel methods of gathering content, editing and visualization engines and printing protocols, merging them and providing a user with an improved visualization, modification and formatting interface for preparing a virtual press run of the ultimate output from the application.

In some embodiments of the invention, the publishing module is accessed through a gateway in a host content application. In the presently preferred embodiment of the invention, the gateway comprises an icon in the menu screen of the host application. According to these embodiments, the publishing module preferably provides a user with more customization options for a print job than the host application and provides the user with a more precise previewing interface for visualizing the print job than the host application.

In some embodiments of the invention, a publishing module is integrated within dedicated printer, a dedicated copier, a dedicated fax machine, a dedicated scanner, or combination peripheral devices with one or more capability selected from among a group of capabilities selected from among printing, copying, faxing, and scanning.

Specific details for various implementations of the invention are disclosed. Although a reader will understand that the objects and goals of the invention may be practiced by a wide variety of general computing environments.

DETAILED DESCRIPTION OF THE INVENTION

The invention is a publishing module providing users with a virtual workspace to prepare, visualize, organize, edit, publish and print documents and other files. As used herein, the terms "module" and "applet" refer to any software or hardware processing component that is used to implement one or more of the disclosed functions of the invention. As used herein an "applet" comprises processing components that execute on a client computer, or on a server, i.e. a servlet. Furthermore, the invention also provides one or more host applications, upon which to interface the applet using one or more plugins. Some examples of host applications comprise Fiery@ Production products, manufactured by Electronics For Imaging, Inc., located in Foster City, Calif.

Figure 1A:
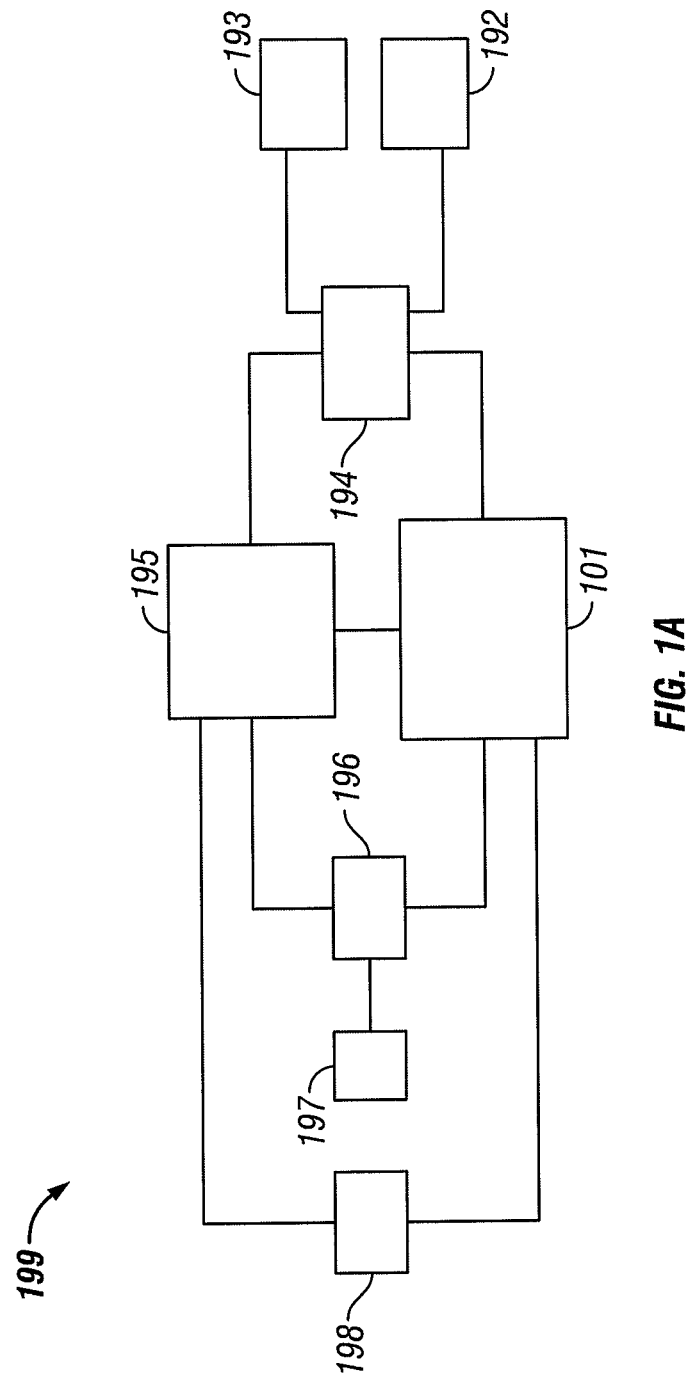
FIG. 1A illustrates a general computing environment upon which the publishing module operates according to some embodiments of the invention.

FIG. 1A illustrates a general computing environment 199 upon which the publishing module 101 operates according to some embodiments of the invention. A publishing module 101 is configured to run on a host application 195. The publishing module 101 and the host application 195 are coupled to an input 198, a processor 196 and an output module 194. In some embodiments of the invention, the computing environment 199 is contained within a personal computer and the input 198 comprises a keyboard (not shown) and a mouse (not shown). Furthermore, in some other embodiments of the invention, the host application 195 and the publishing module 101 are connected over a computer network and/or across a server.

The processor 196 is further coupled to memory 197. In some other embodiments, the host application 195 and the processor 196 are directly coupled to memory 197.

Furthermore, the output module 194 is coupled to a graphical user interface (GUI) 193 presented to a user on a monitor (not shown). Finally, the output module 194 is preferably coupled to one or more printer 192.

FIG. 1A illustrates an exemplary computing environment 199. However, it will be readily apparent to those having ordinary skill in the art having the benefit of this disclosure that other suitable computing environment, now known or later developed, are similarly applicable.

The publishing module 101 of the invention gathers content files, viewing engines, editing engines, printer files, image enhancement applets, and printer capability protocols, among other data. The invention also allows a user to manipulate the content files in light of the gathered printer settings such that the user is able to visualize how a document looks like when it is printed. In those embodiments in which the publishing module 101 is coupled to memory, the publishing module is also configured to gather one or more template for providing a user with one or more user friendly editing/printing solution.

The publishing module 101 affords the user realistic print imaging, such that "what you see is what you get." Accordingly, the publishing module 101 provides a significant advantage to print imaging available in the prior art.

Figure 1B:
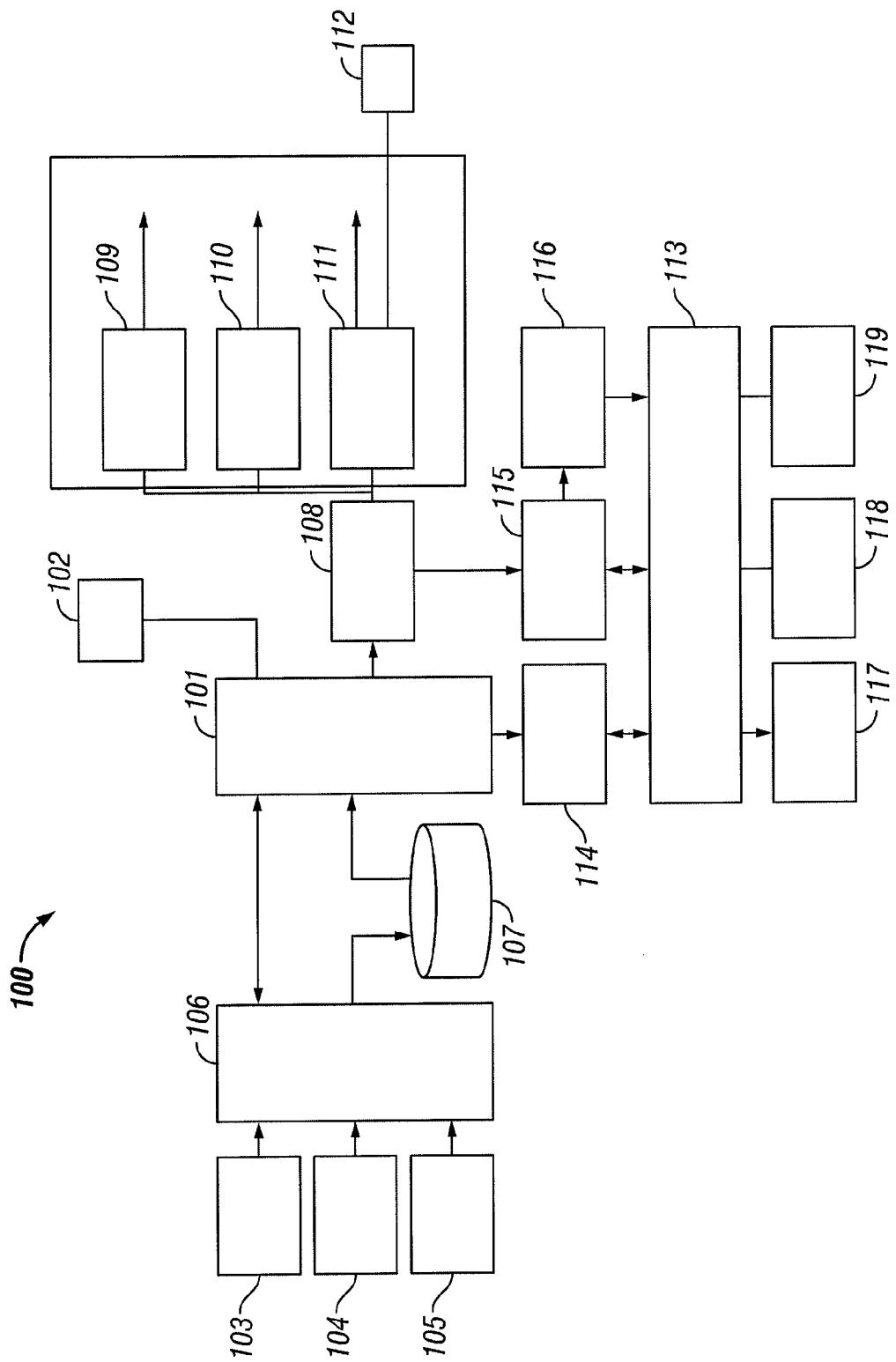
FIG. 1B illustrates an example of computer architecture with a publishing module for accomplishing a virtual press run according to the invention.

FIG. 1B illustrates an example of computer architecture 100 taking advantage of the publishing module 101 according to the invention. The publishing module 101 is configured to input and output various files and viewing/printing protocols via a series of Application Programming Interface (API) calls. The publishing module 101 applies a workflow to the imported files to produce a dynamic visualization of a document that takes printing options into account as they are adjusted by the user. As such, the publishing module 101 allows the user to reformat the print job into a "what you see is what you get" virtual press run. The publishing module is further configured to send the formatted print job to a printer. The workflow is at least partially controlled by a user via a user interface 102. An example of a workflow is described below in the discussion of FIG. 2.

Referring still to FIG. 1B, the publishing module 101 is coupled with various content sources 103, 104, and 105. In some embodiments of the invention, the publishing module 101 is directly coupled with the content sources 103, 104, and 105. In some other embodiments of the invention, the publishing module 101 is remotely coupled to one or more of the content sources 103, 104, and 105 via a network.

In some embodiments of the invention content sources 103, 104, and 105 comprise Powerpoint® (.ppt) files, Word® (.doc) files, and Excel® (.xls) files, respectively, all available from a Microsoft® Office Suite product, produced by Microsoft® Corporation. According to these embodiments, the content source includes an API and the publishing module 101 may be accessed via one or more Plug-In supported by Microsoft® Office user interface via a custom button or icon through an API call. See "Office New User Experience: UI Style Guide for Solutions and Add-Ins" for more Information regarding Microsoft® customization and developer's tools. (Microsoft Corporation, Office New User Experience: UI Style Guide for Solutions and Add-Ins, http://www.microsoft.com/downloads/details.aspx.)

Although Microsoft® Office Suite products are mentioned explicitly, here and throughout the disclosure, it will be readily apparent to those having ordinary skill in the art with the benefit of this disclosure that any content source that can be imported could benefit equally from the publishing tools of the present invention. For example, in some other embodiments, content is gathered from an Adobe® product.

In some embodiments of the invention, a run-list database 107 is coupled with the publishing module 101. The run-list 107 database comprises an inventory of content source pages that are modified and placed on to sheets as instructed from the content source application. In some embodiments of the invention, the content sources 103, 104, and 105 are coupled to the publishing module 101 via one or more run-list database 107.

The publishing module 101 is further coupled to a view/edit module 113. In some embodiments of the invention, the view/edit module 113 is coupled to the publishing module 101 via an edit API 114. The view/edit module 113 is coupled to one or more engines for presenting a representation of the content files. For example, in some embodiments, the view/edit module 113 is coupled to a three-dimensional engine 117, a two-dimensional engine 118, a JavaScript engine, and/or a Flash engine 119. The view/edit module 113 allows a user to view and edit the content gathered from the content sources 103, 104, and 105 on the user interface 102. Preferably, the editing and viewing is performed in light of a set of gathered printer capabilities.

The publishing module 101 is also coupled to a printer capability/print job building module 108. The printer capability/print job building module 108 gathers various printing protocols and settings from one or more printer 112 and provides the user with the gathered printer options. Furthermore, various output modules 109, 110, 111 are coupled to the printer capability/print job building module 108 to perform certain print job processing functions. For example, in some embodiments, the output modules 109, 110 and 111 are configured to convert documents, flatten images and/or perform capability checking and fixing. In some embodiments of the invention, the printing options are gathered and communicated in a PostScript printing protocol.

In some embodiments of the invention, the output module 109 comprises a color space transform application. A color space transform converts the representation of a color from how it appears in the host application or in the publishing module GUI to how it looks when printed, based on the gathered printers' color capabilities. In some embodiments, the color space transform attempts to make the printed color look as similar as possible to the visualized color. These embodiments are particularly useful for corporate color branding applications, for example.

Furthermore, the publishing module 101 and the printer capability/print job building module 108 are configured to build print jobs for sending to the one or more printers 112. Preferably, print jobs are communicated to the printers using a technical print standard such as a Job Definition Format (JDF). For technical information regarding the JDF format please see "Layout Creator to Imposition ICS". (http://www.cip4.org/document_archive/documents/ICS-Lay-CrImp-1.3.pdf)

In the presently preferred embodiment, the view/edit module 113 is also coupled to the printer capability/print job building module 108 via module 115. According to these embodiments, the publishing module 101 allows a user to preview, edit, and format various document printing/publishing options in light of gathered printer capabilities. As such, the user will be presented with a precise preview of what a print job will actually look like on any selected printer.

Although the computer architecture 100 of FIG. 1B is described in terms of a plurality of discreet processing modules, it will be readily apparent to those with ordinary skill in the art having the benefit of this disclosure that one or more of the modules can be integrated into a single module or one or more multi-function modules (collectively referred to as "processing modules").

As used herein the term "processing module" shall mean any software processing component, hardware processing component, or portion thereof that may be used to implement one or more of the processing functions.

Print Option Visualization

Some embodiments of the invention comprise a module for gathering the various editing, viewing protocols, printer options, content files, etc and merging them to provide a realistic view of how a print job appears in light of those options. However, after an initial preview of a print job with current printing options, a user may wish to alter how the job is printed.

According to known printing option interfaces, the user is typically given an opportunity to select new print options but without being able to precisely see how those options change the look of the final printed document. For example, when preparing a Microsoft® PowerPoint presentation, a user may desire to print in a booklet form. Known print previewing methods allow a user to see abstract images configured in booklet form, wherein the images are not representative of the actual content. These methods fall short by failing to show the user exactly how the actual output will look in booklet form.

Indeed, this shortcoming is not trivial. For instance, a user may desire an image to span across two pages such that a continuous image is visible when a booklet is opened to those pages. According to the prior art, a user is forced to make their best guess about the continuity of the two-part image across successive pages, select booklet printing, and print a test run. Assuming that the estimation was not perfect, the user is required to change the layout until the test run is perfect.

Figure 1C:
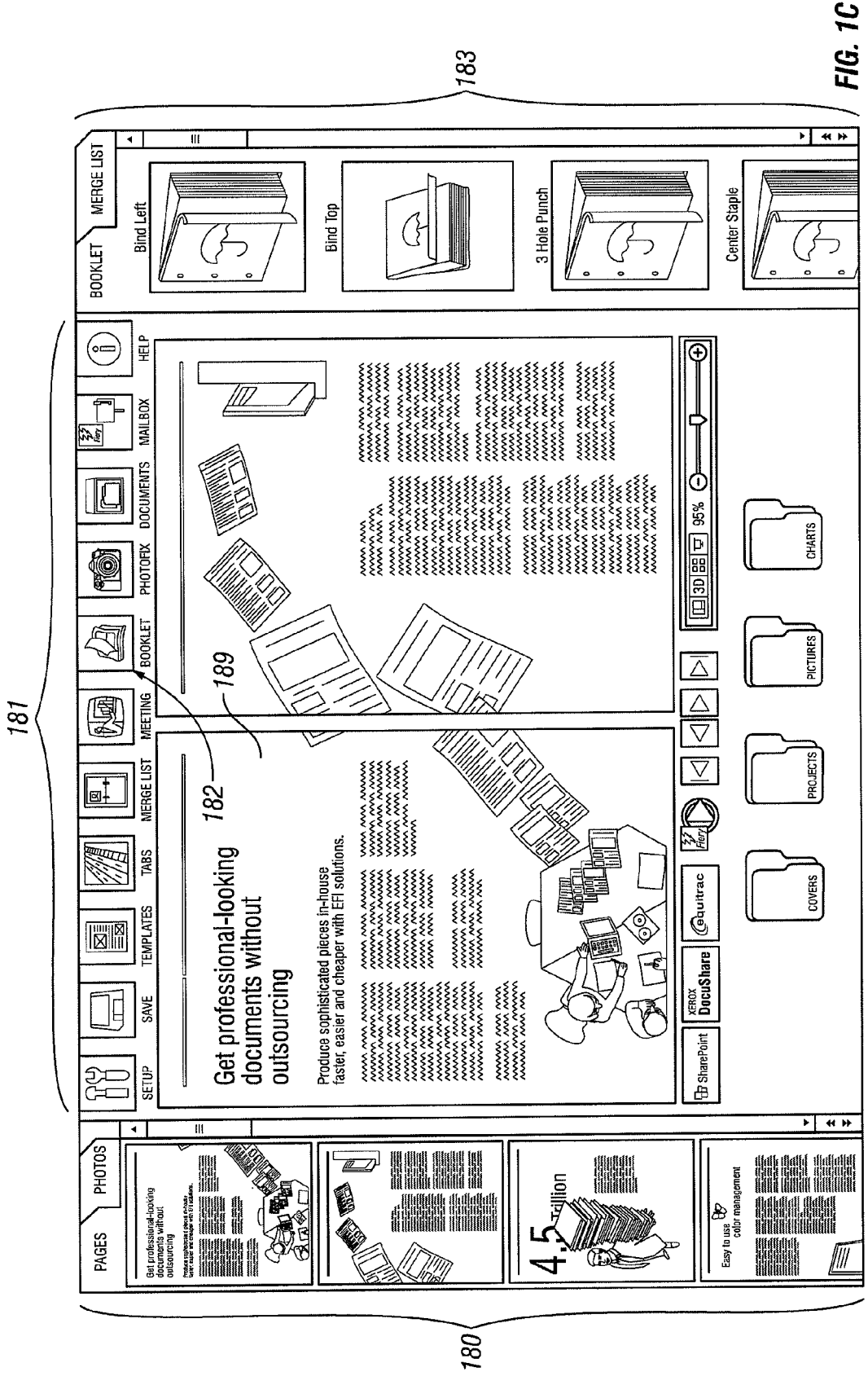
FIG. 1C illustrates a user-friendly graphical user interface (GUI) allowing a user to easily prepare a "what you see is what you get" virtual press run.

In light of the need for robust print previewing, the invention provides a user with a visualization tool that clearly shows how a change to one or more printing option affects the look of a print job. FIG. 1C illustrates user-friendly graphical user interface (GUI) allowing a user to easily prepare a "what you see is what you get," virtual press run. FIG. 1C clearly illustrates how the invention operates to cure the defects of known art as illustrated in the prior example.

FIG. 1C illustrates a GUI showing a list 180 of presentation pages, a number of tool icons 181 and a visualization plane 189 for showing a virtual press run image of the source content. Among the tools 181 is a booklet icon 182 which allows a user to format their print job in a booklet form. On the right of the GUI are various booklet options 183. As shown, a user visualizes exactly how the print job looks in booklet form, ensuring a user that an image spanning across two pages is a continuous image when the printed booklet is opened to those pages. As such, the visualization tools of the invention provide the user with a virtual press run.

What You See is What You Get

Many content source applications give a user some printing and page setup options providing merely a base level of customization for print jobs. However, various factors contribute to differences between what a user expects to be printed and the final product that is actually printed. For example, a printer may be capable of drilling or punching holes in a text document. According to this example, a user prepares a text document and selects this punching option. According to known print previewing and formatting methods, the user can visualize the plain text document without punch hole in a print preview, but may be surprised when the document is printed and a portion of the text is punched through.

However, according to the invention, the printer's capabilities, paper attributes and page layout attributes are each considered by the publishing module and merged with the editing and visualization engines to present the user with a virtual press run. Therefore, when a user selects a particular print option, they are presented with an accurate representation of how the print job looks. Using the above example, when the user selects a punch option, the preview visualization tool may show the text being partially punched. As such, the user may move the text or forego the punching options to cure the defect before actually printing.

In the presently preferred embodiments of the invention, the processing modules described above provide a wide variety of instant feedback to a user via the visualization tools. In another illustrative example, pluralities of publishing tools are offered to a user via a GUI. For example, a stapling function allows a user to define a desired stapling location in a finishing operation for a print job. According to this example, an icon of a stapler can be provided in the GUI to access the stapling options. In some embodiments, instant feedback is given to a user upon rolling over the stapler icon with a mouse pointer in the form of a staple appearing in a default position or a custom position within a visualization panel.

Although hole-punching and stapling visualization options are disclosed explicitly herein, it will be readily apparent to those with ordinary skill in the art having the benefit of this disclosure that a wide variety of visualization options are equally applicable including those now known or later developed.

In this sense, the invention truly delivers a "what you see is what you get" preview of a print job. Accordingly, the user does not have to print a test run of a print job, as the publishing module has already presented the user with a truly representative virtual press run.

Workflow

Figure 2:
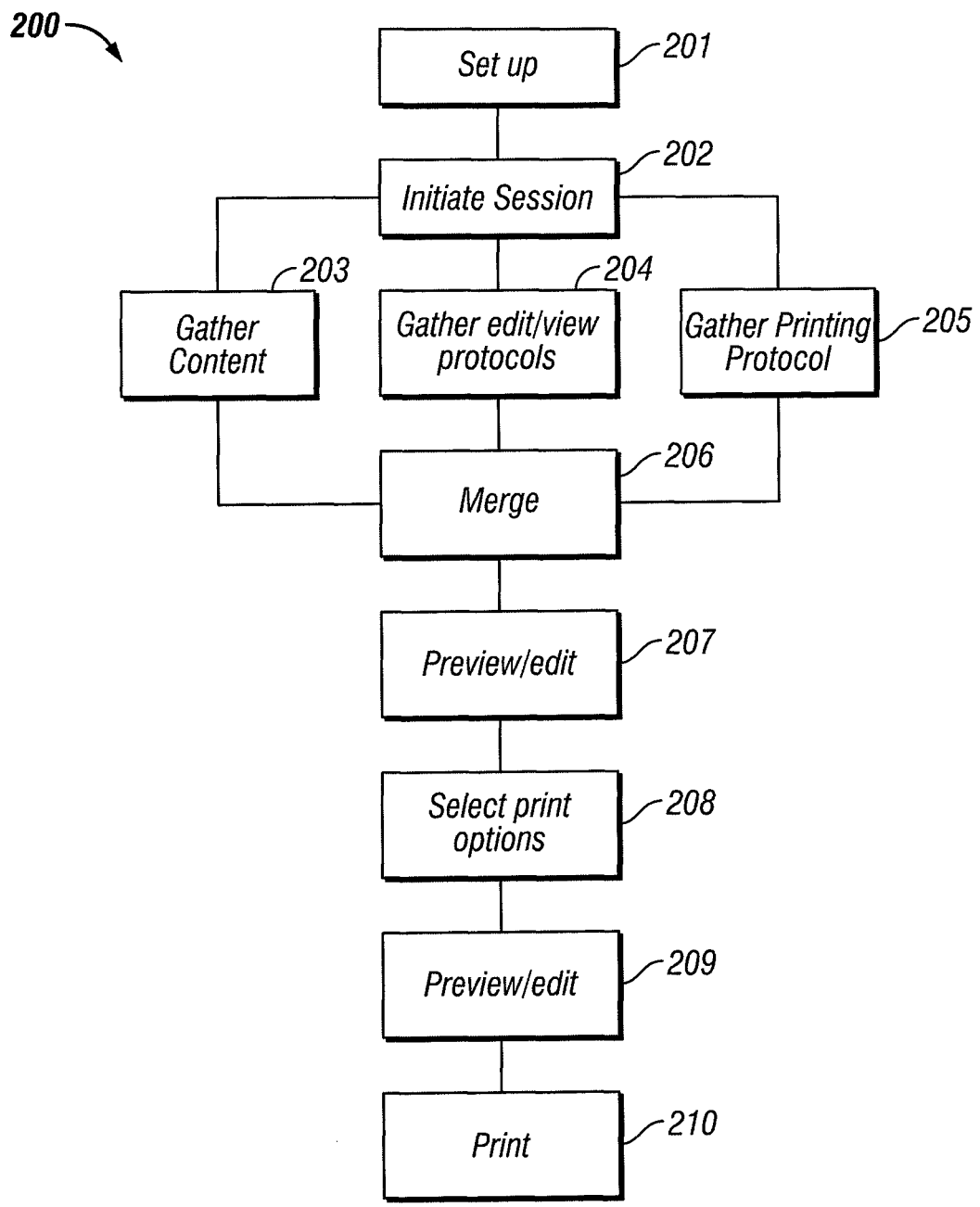
FIG. 2 illustrates a workflow for publishing content according to some embodiments of the invention.

The network architecture of FIG. 1B provides publishing tools for a wide variety of applications and in a wide variety of printing and imaging environments. FIG. 2 illustrates a workflow for publishing content according to some embodiments of the invention.

Figure 3A:
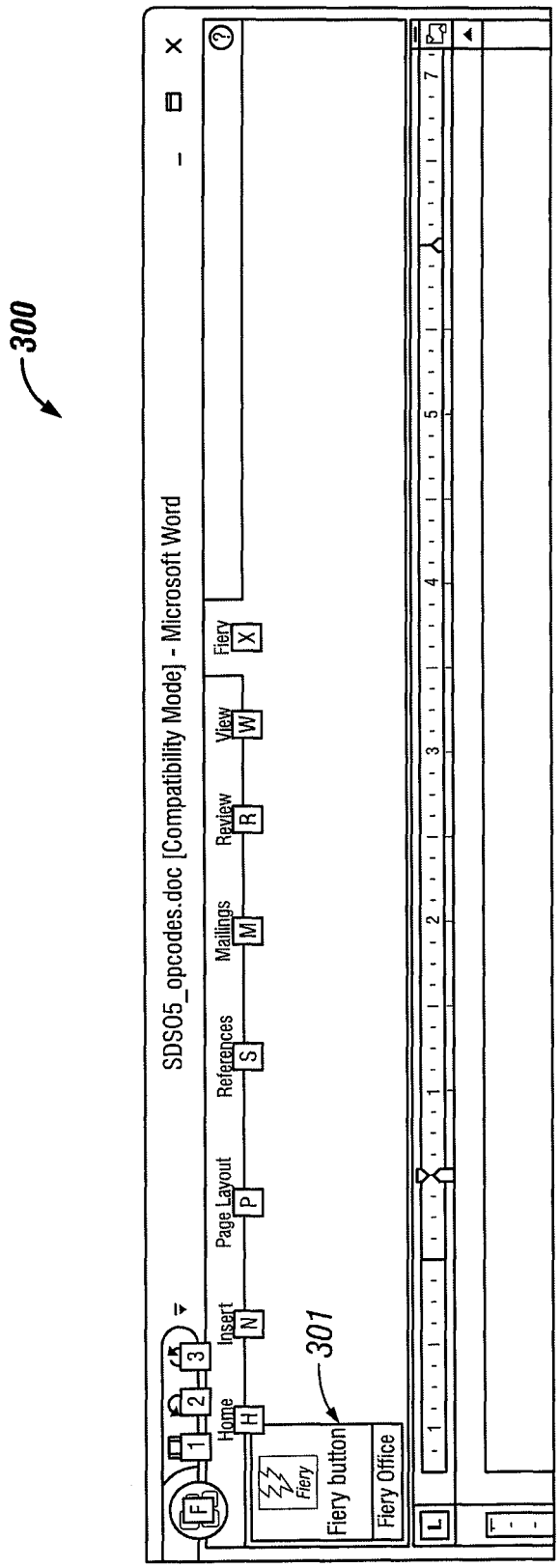
FIG. 3A illustrates a word processing menu interface including an application gateway to an interface for the publishing module according to some embodiments of the invention.
Figure 3B:
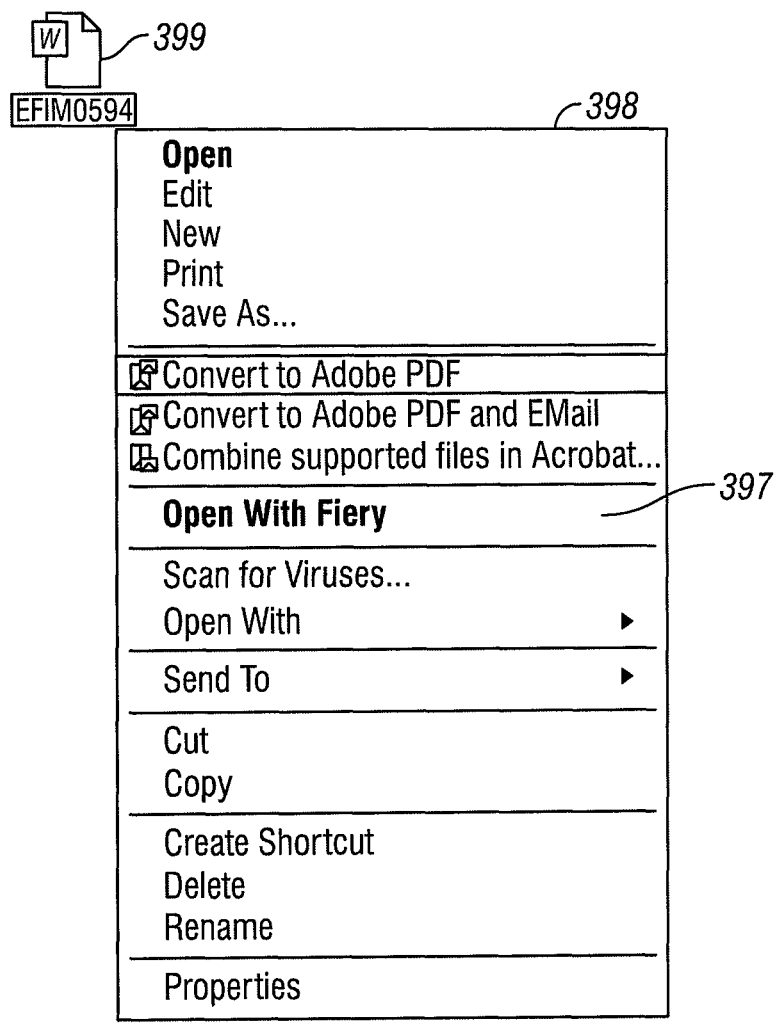
FIG. 3B illustrates a word processing menu interface including a desktop gateway to an interface for the publishing module according to some embodiments of the invention.

The workflow 200 begins with Setup step 201. Setup step 201 comprises installation and configuration of the applet. In some embodiments, the applet is specifically configured to be compatible with a certain host application, i.e. Microsoft® office. Once the setup step 201 is complete, the workflow 200 continues when a user initiates a session at step 202. In some embodiments of the invention, a session is initiated through the host application. For example, when configured for Microsoft® Office, a session is initiated through a button or tab in the Microsoft® Office interface, as illustrated in FIG. 3A. In some other embodiments, a session is initiated by right-clicking an icon of a content file on a computer desktop, as illustrated in FIG. 3B.

The workflow 200 continues as the applet gathers content at step 203 from one or more host application or other content source, gathers edit/view protocols at step 204, and gathers printing protocols at step 205. In some embodiments of the invention, the printing protocols are communicated as a PostScript file.

After the various information is gathered at steps 203, 204, and 205, the workflow 200 continues by merging the gathered content and protocol information at step 206. Preferably a publishing module merges the gathered content and protocols and allows a user to access and interact with the content in light of the gathered view/edit protocols and printer capabilities.

After the merging step 206 the user previews and/or edits the content at step 207. Likewise, at step 208, the user selects printing options in light of the gathered printer protocols. Once the printer options are selected, the content may look different than prior to a printer preference change. As such, the user may chose to edit the content again at step 209. After step 209, the image of the content on a computer screen is precisely how the image appears from a printer.

Finally, at step 210 the content is printed on one or more printers such that the images are printed precisely how they appeared within the applet GUI. In some embodiments of the invention the reformatted document/image is cached and saved for later use. In some embodiments of the invention, a cached reformatted file can be used as a template for future content formatting tasks.

Host Application Gateway/Desktop Gateway

A user accesses the publishing module of the invention and initiates a workflow through a gateway. As used herein, the term "gateway" refers to an interface which passes both control status and page description language information to the publishing module.

As explained above, according to some embodiments, a user initiates the workflow 200 by clicking an icon or button in the interface of a host application. FIG. 3A illustrates a word processing menu interface 300 including a gateway 301 to an interface for the publishing module. As shown the gateway 301 is a menu button. By pressing the menu button, a user initiates the publishing applet and exports the word processing content from the host application to the applet interface. The applet also imports editing and viewing protocols as well as printing capabilities. Once the various files and data are imported, the publishing applet applies one or more workflow to edit, reformat and preview the content. After the user is satisfied with the reformatting, the content can be printed.

FIG. 3B illustrates a desktop gateway option of initiating a formatting and visualization applet according to some embodiments of the invention. A representation of a desktop icon 399 for a word processing file is shown with a corresponding list of options prompted by right-clicking the icon 399 with a mouse or similar pointer. Among the list 398 is an Open With Fiery command 397. By choosing the Open With Fiery command 397, a user initiates the publishing applet and exports the word processing content from the host application to the applet interface.

Layout Customization

The invention also provides a more robust viewing, editing, and formatting environment for document publication. Merging content with the gathered editing/viewing protocols and the gathered printer capabilities with the publishing applet allows a user to take full advantage of the printers' capabilities.

In some embodiments, the processing modules described above automatically separate ingested files, images, slides, etc. (collectively referred to as "files") into meaningful groups based on the native file's file description or associated metadata. For example, in some embodiments of the invention, PDF files are separated into meaningful sections based on the PDF's table of contents. In some other embodiments of the invention, the slides of a Microsoft PowerPoint presentation are separated into meaningful sections based on similar title headings. In some embodiments of the invention, Microsoft Excel charts are separated using sheet identifiers. In some embodiments, word processing files are separated into meaningful sections based on page breaks.

In some embodiments, the processing modules force files from separate sections into separate pages in a finished print job. For example, in a print job having multiple pages per sheet of paper, i.e. 2-Up, 4-Up, etc., files with different sections will not be placed on the same sheet as another section.

In some other embodiments of the invention, tabs are automatically inserted into a finished file based on the sections described herein.

In some embodiments, the invention gathers whether tab stocks are currently programmed into the print engine. According to these embodiments, the visualization tools allows a user to navigate to the separate sections of merged file by clicking the virtual representation of the tab ears.

In some embodiments, the invention gathers printer capabilities from one or more printer to provide a user with a more robust viewing, editing, and formatting environment for document publication. For example, in some embodiments of the invention, a group of printers networked to a user's computer may have more print options available to a user than the host application is enabled to take advantage of. According to the invention, the printing capabilities of the publishing applet are superior to those of the host program. Indeed, these options may be taken advantage of through the publication applet interface, whereas they would not have been previously available through use of the hose program alone.

Figure 4A:
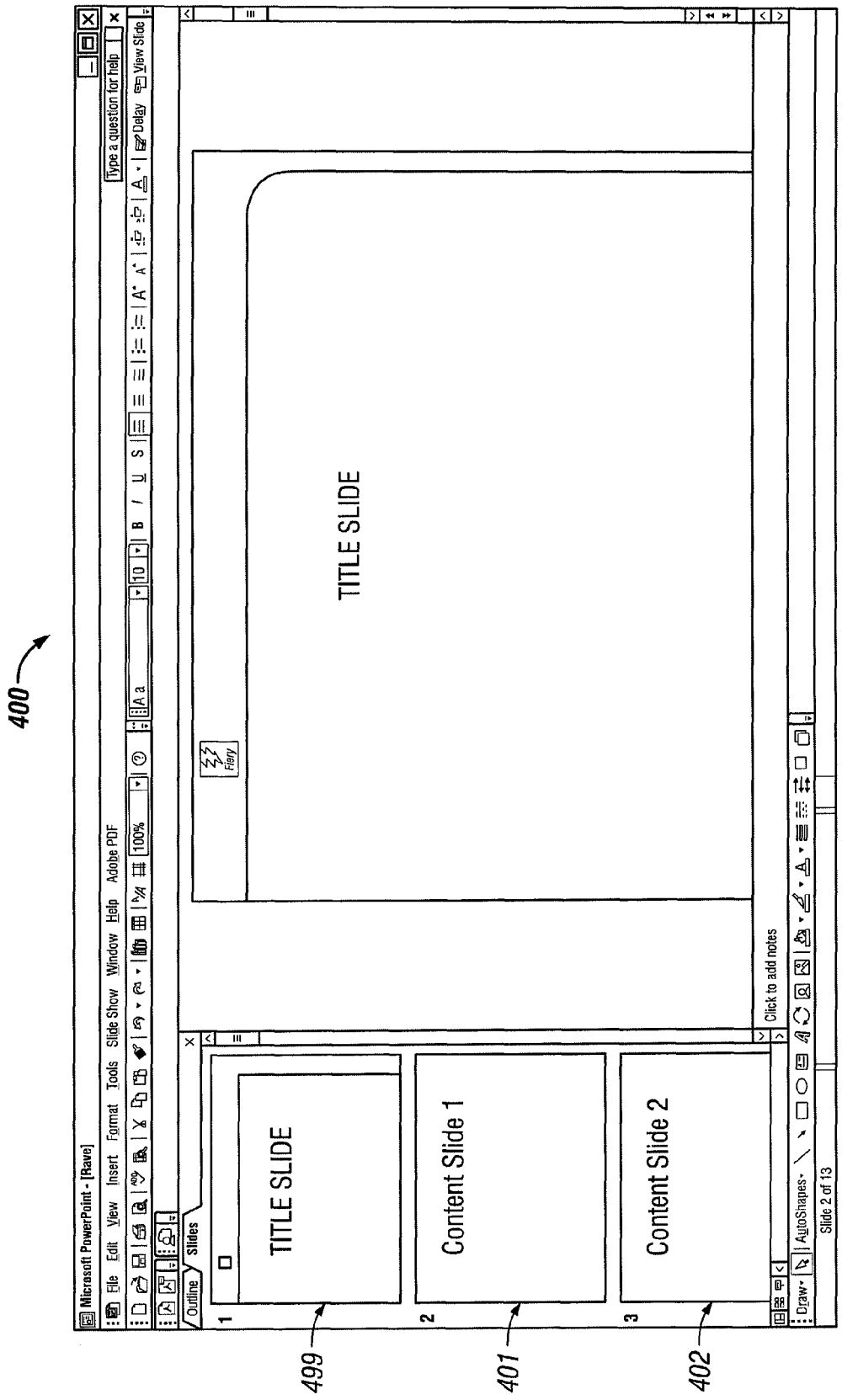
FIG. 4A illustrates a sample presentation content source application for the creation of presentation slides.

For example, FIGS. 4A-4E provides illustrative examples of how the publishing applet of the invention enhances a user experience. FIG. 4A illustrates a sample presentation content source application 400 for the creation of presentation slides. According to this example, a user creates a set of presentation slides with the application 400 that includes a title slide 499 and content slides 401, 402, . . . n. The user may chose to print the presentation using the content source application 400 after the presentation slides are created.

Figure 4B:
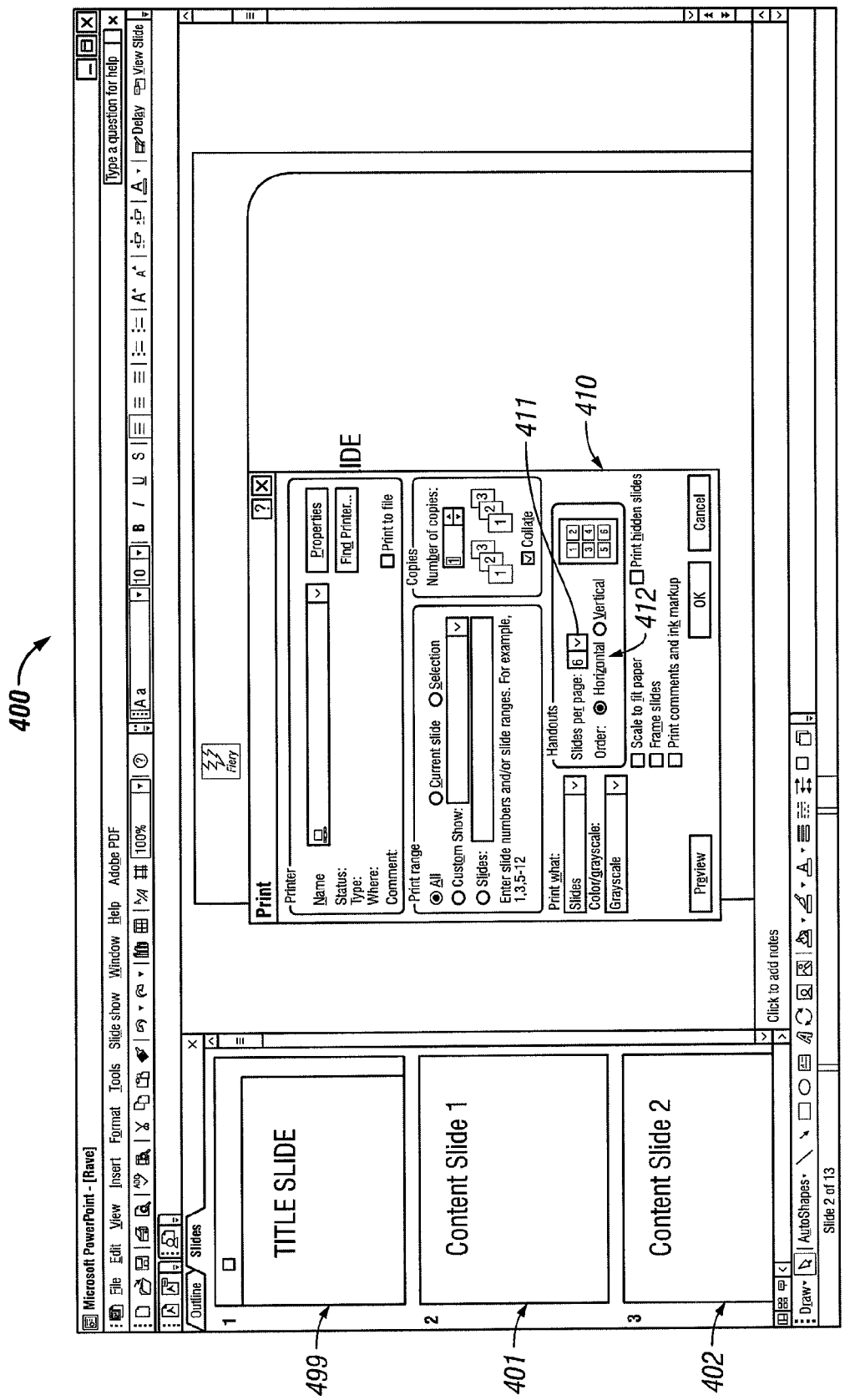
FIG. 4B illustrates a conventional print options prompt for presenting the user with print options for a given printer according to the prior art.

FIG. 4B illustrates a typical print options prompt 410 available through a sample application showing print options for a given printer to a user. As shown, the print options prompt 410 gives a user the option to print more than one slide per page using a Handout pull-down menu 411 and radio buttons 412.

Figure 4C:
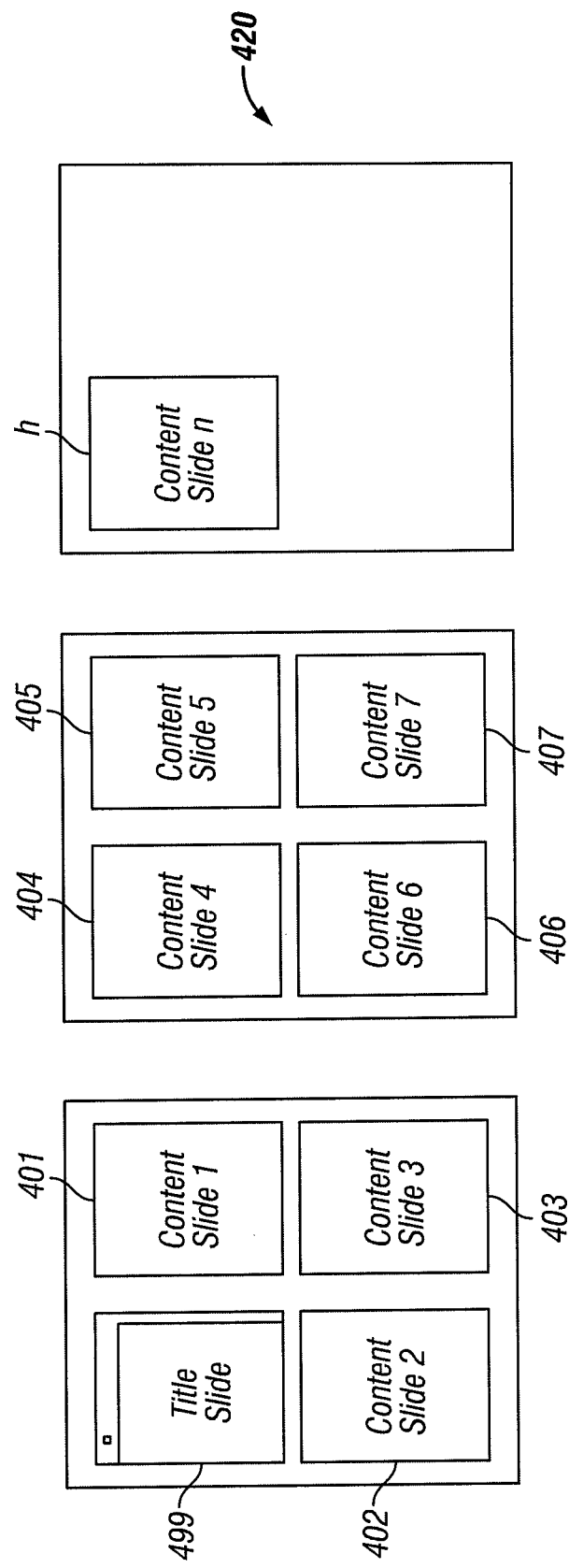
FIG. 4C illustrates an example of a three page print job using the print options available to a user from the presentation content source application according to the prior art.

FIG. 4C illustrates an example of a three page print job 420 using print options available to a user from the presentation content source application 400. As shown, the user can to print multiple slides per page, as presented to the user via the print options prompt 410. Specifically, the print job 420 is in a 4-Up configuration, meaning four slides per page.

However, oftentimes the content source application 400 falls below a user's expectations in terms of printing customization. For example, a user may instead wish to print the title slide 499 on its own page before putting content slides 401, 402, 403, 404, 405, 406, 407, . . . n in a 4-UP configuration. Using the publishing tools of invention, a user can customize the layout of the print job.

Figure 4D:
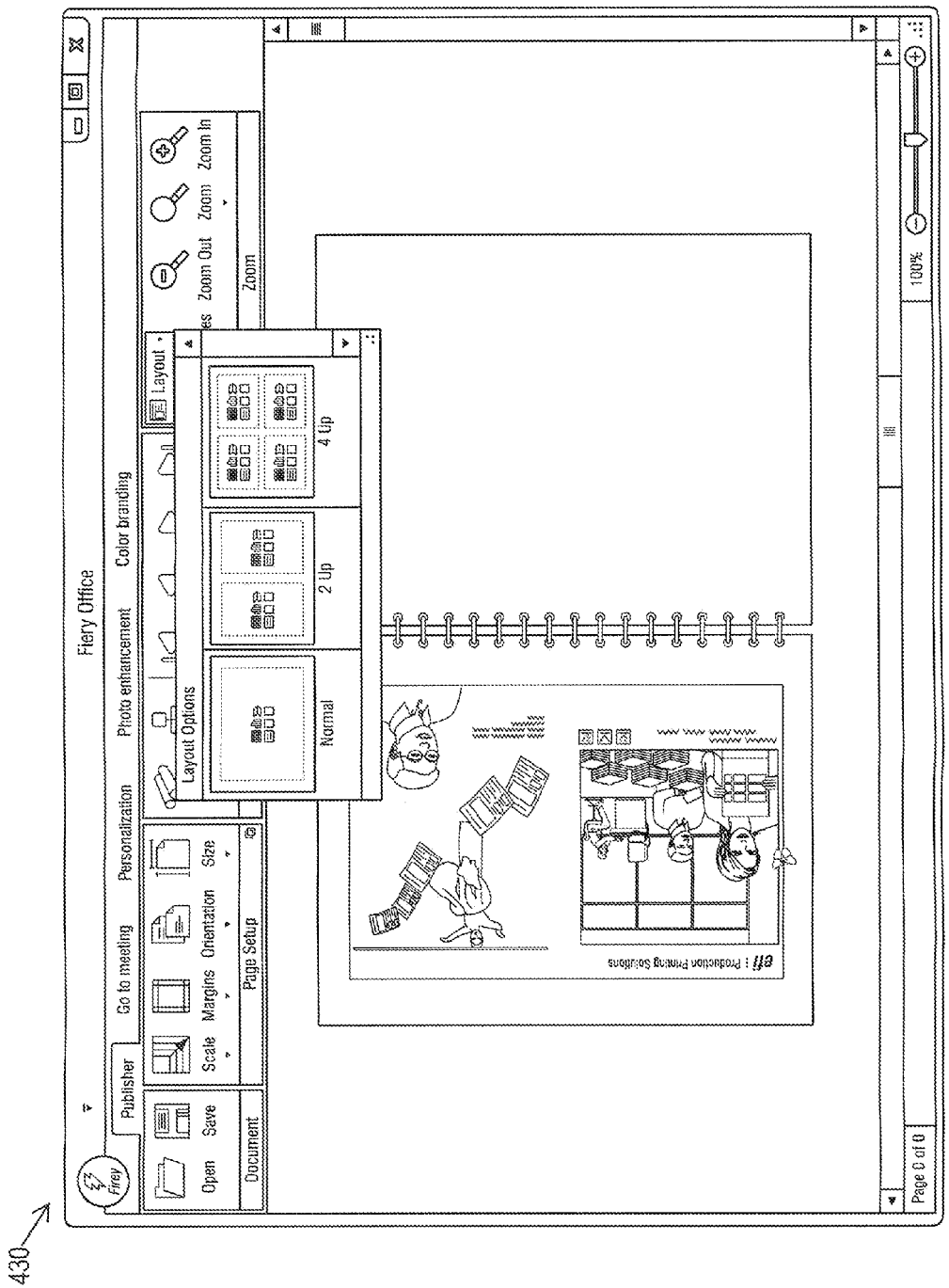
FIG. 4D illustrates an exemplary interface for print job layout customization according to some embodiments of the invention.

FIG. 4D illustrates an exemplary interface 430 for print job layout customization according to some embodiments of the invention. According to these embodiments, a user initiates the customization session via a gateway in a content creation application, as explained in discussing FIG. 3A and FIG. 3B. Using the various formatting tools, a user can customize a print job in light of printer capabilities gathered from the networked printers.

Figure 4E:
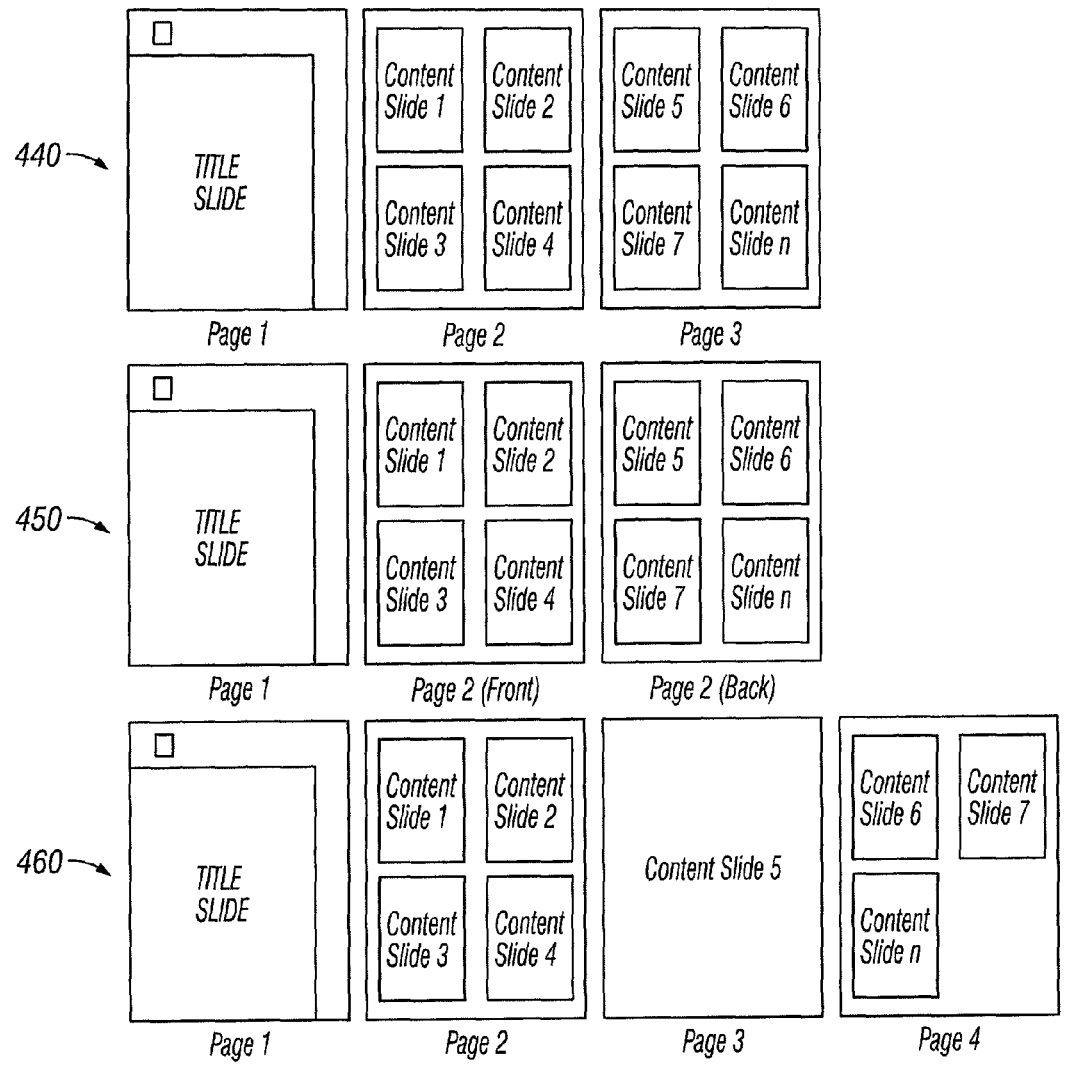
FIG. 4E illustrate sample layouts available to a user using the publishing module of the invention showing clear customization advantages over the prior art.

FIG. 4E illustrates sample layouts available to a user using the publishing module of the invention showing clear customization advantages over the prior art. According to some embodiments of the invention, these layouts are made possible by referencing a run-list database, pulling source content from the database, and placing it on sheets as desired by the user.

Referring still to FIG. 4E, layout 440 shows a layout with the title slide on its own page 1 and content slides in a 4-up format on subsequent pages 2 and 3. Layout 450 shows a layout with a title slide on its own page 1 and content slides in a 4-up format on the front and back of subsequent page 2. Layout 460 shows a layout with a title slide on its own page 1, content slides 1-4 in a 4-up configuration on page 2, content slide 5 on its own page 3 and content slides 6, 7, . . . n on subsequent page 4 in a 4-up format. Although these particular layouts are shown explicitly, it will be readily apparent to those having ordinary skill in the art having benefit of this disclosure that a wide variety of alternative configurations.

Graphical User Interface

As explained above, the invention provides a user-friendly interface allowing you to easily prepare a "what you see is what you get" virtual press run. FIGS. 5A-5D illustrate other examples of a graphical user interface (GUI) and show how changing various print options result in a dynamic/realistic view of how the print job appears when actually printed.

Figure 5A:
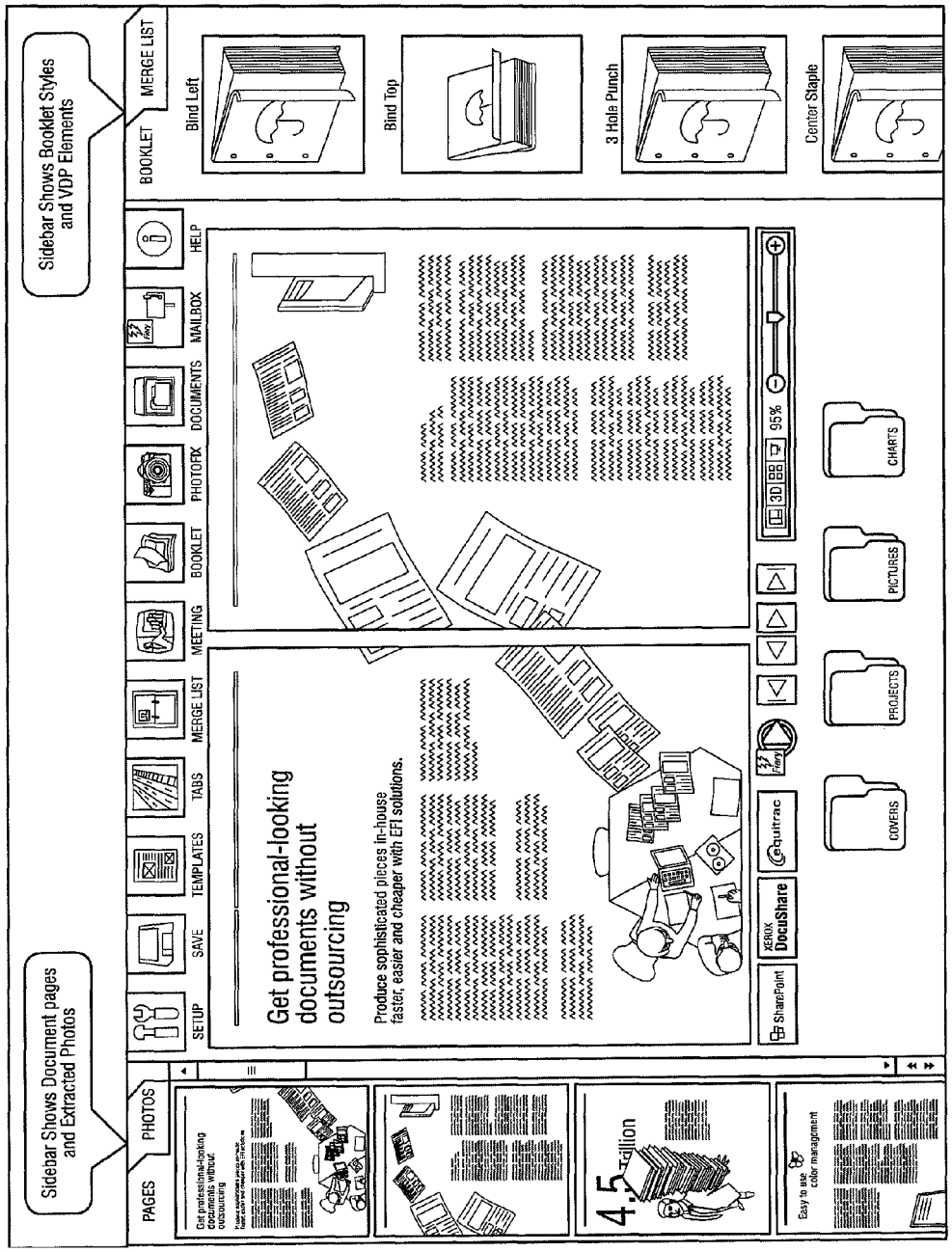
FIG. 5A illustrates an example of a graphical user interface for providing a virtual press run according to some embodiments of the invention.

FIG. 5A shows one example of a GUI for providing a virtual press run according to some embodiments of the invention. As shown, the GUI presents a two-dimensional layout scheme to a user. Various tools are also presented to the user for editing, formatting, importing/exporting, and print option editing, among other tools.

Figure 5B:
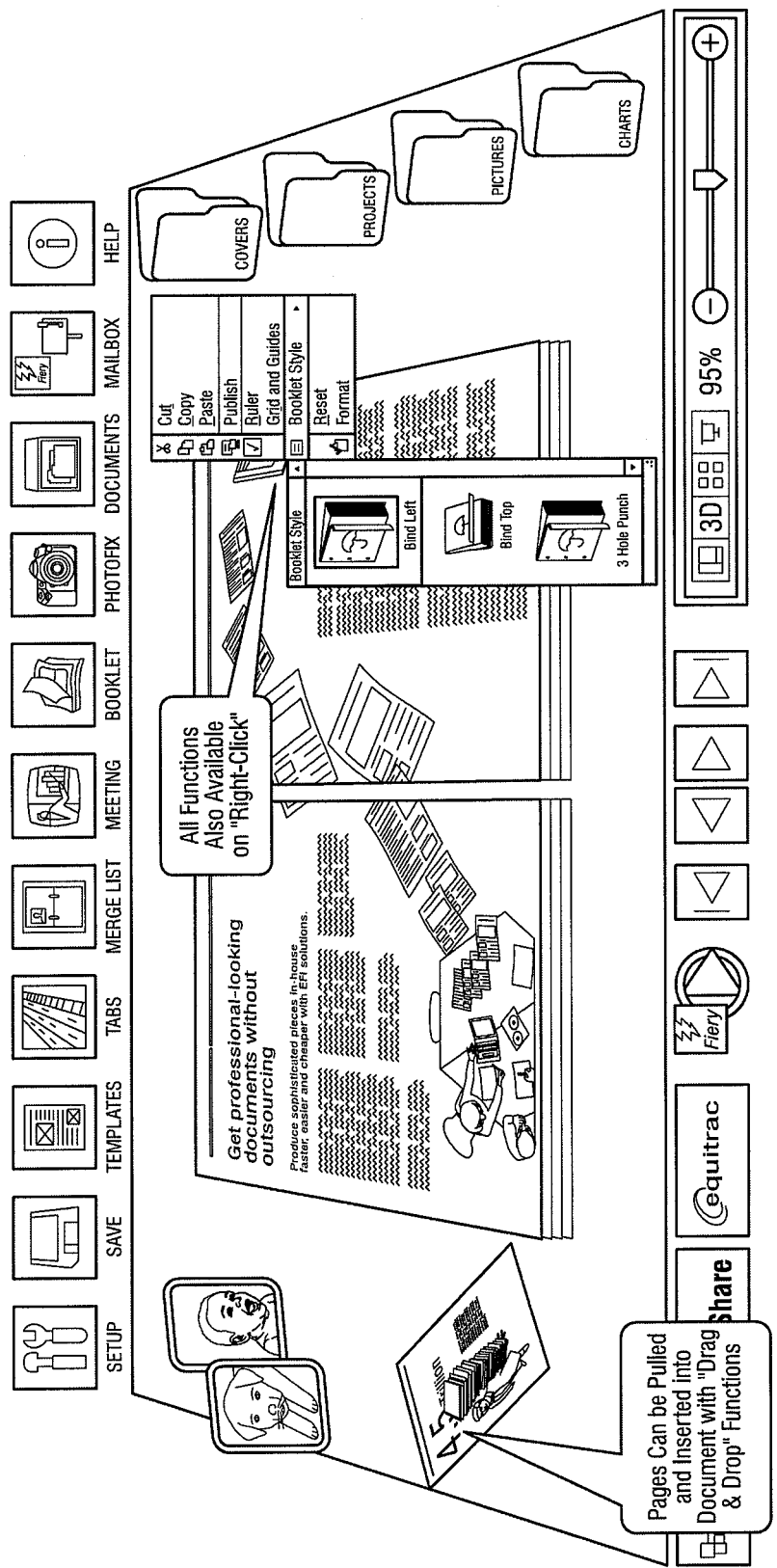
FIG. 5B illustrates another example of a graphical user interface for providing a virtual press run according to some embodiments of the invention.
Figure 5C:
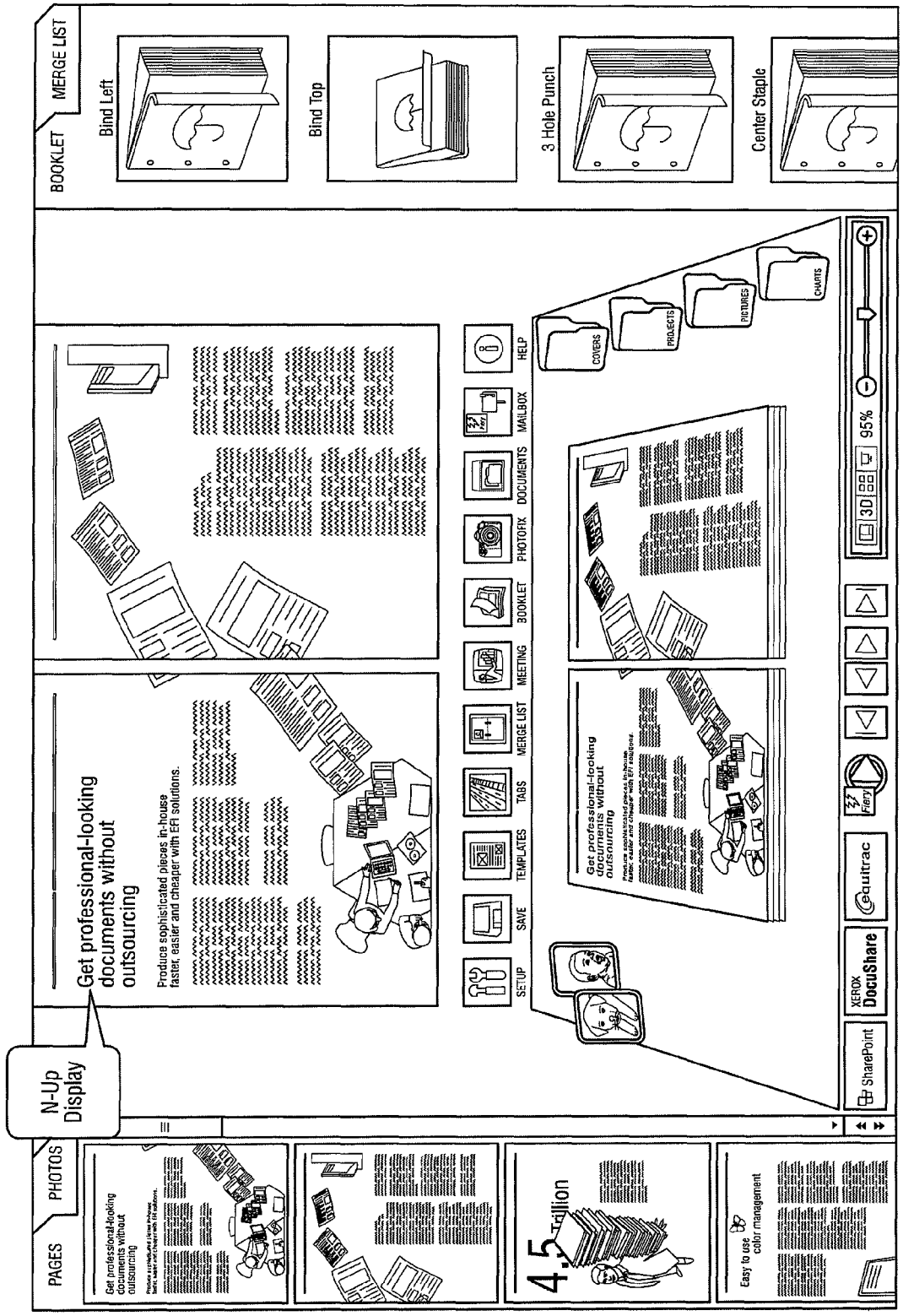
FIG. 5C illustrates a hybrid graphical user interface comprising a three-dimensional display as well as a two dimensional 2-up display, showing two pages of a print job according to some embodiments of the invention.
Figure 5D:
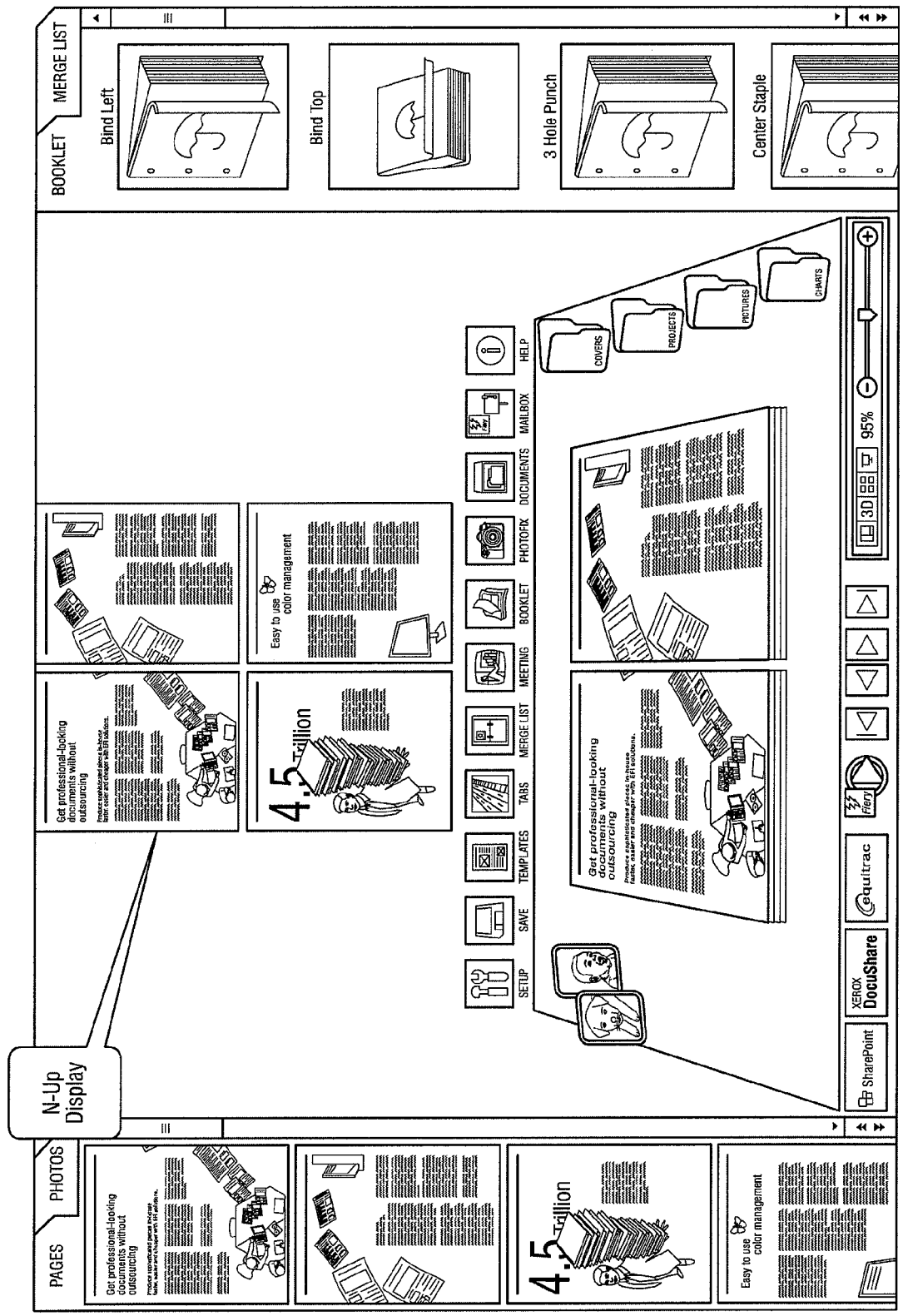
FIG. 5D illustrates a hybrid graphical user interface comprising a two dimensional 4-up display as well as a three-dimensional counterpart according to some embodiments of the invention.

FIG. 5B illustrates another example of a GUI according to some embodiments. FIG. 5B illustrates three-dimensional layout scheme. FIG. 5C illustrates a hybrid interface comprising a three-dimensional display as well as a two dimensional 2-up display, showing two pages of a print job. According to these embodiments, changes made to either display are reflected on the other. Finally, FIG. 5D illustrates a similar display having a 4-up display as well as three-dimensional counterpart.

In some embodiments of the invention, pluralities of viewpoints are offered to a user of the finished document. In some embodiments, a separate, small window viewpoint is displayed within a finished view for allowing a user to modify the file while viewing how a change the overall look of the file. For example, a small viewpoint is offered when a user clicks a tab ear—allowing a user to enter text into the tab ears while still showing the full, finished view in a second viewpoint. Preferably, both viewpoints are live, meaning that text entered in the first viewpoint is showed in the second as it is typed.

The various GUI arraignments of the invention afford a user easy editing and visualization, and allow a user to get a better feel of how a print job actually appears once printed.

It will be readily apparent to those with ordinary skill in the art having the benefit of this disclosure that, while various examples of a GUI are presented explicitly herein, a wide variety of similar GUIs can be used to accomplish similar aspects of the invention.

FIGS. 1A-5D illustrates general implementations of the invention. In the following paragraphs, a more specific implementation example is described for carrying out the invention. It will be readily apparent to those having ordinary skill in the art having the benefit of this disclosure that a wide variety of other implementations are equally applicable.

Implementation on Peripheral Devices

In some embodiments of the invention, the processing modules are implemented into one or more peripheral device. For example, in some embodiments of the invention, the publishing module is integrated within dedicated printer, a dedicated copier, a dedicated fax machine, a dedicated scanner, or combination peripheral devices with one or more capability selected from among a group of capabilities selected from among printing, copying, faxing, and scanning.

In some embodiments, the one or more of the publishing, editing, visualization, or other processing modules are embodied within a peripheral device with scanning and copying functions. In some embodiments, the device scans one or more document set into a publishing workspace and provides a user with tools to assemble pages, adjust the pages, adjust the page order, adjust the page dimensions, adjust the color, adjust the contrast, define the number of copies desired for printing, etc., all within a GUI on the device's display.

Figure 6:
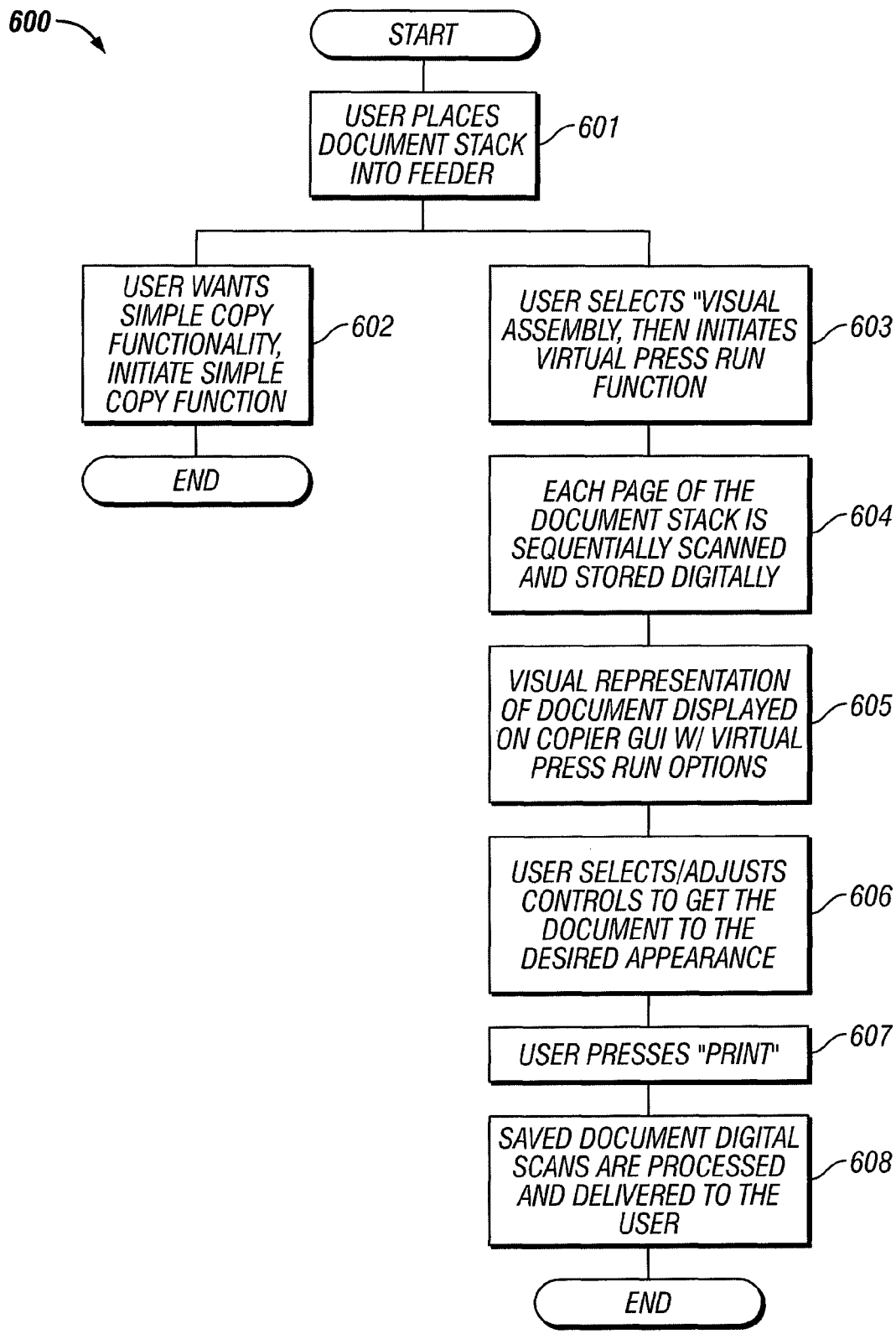
FIG. 6 illustrates an illustrative workflow for implementing the virtual press run tools on a peripheral device according to some embodiments of the invention.

FIG. 6 illustrates an illustrative workflow 600 for implementing the virtual press run tools on a peripheral device according to some embodiments of the invention. Although a specific workflow is described herein for a particular implementation, it will be readily apparent to those with ordinary skill in the art having the benefit of this disclosure that a number of workflow are possible to carry out the invention on peripheral devices whether currently known or later developed.

The workflow of FIG. 6 illustrates an illustrative workflow 600 for implementing the virtual press run tools on a copier according to some embodiments of the invention. According to FIG. 6, the workflow 600 begins with a user placing one or more document stack into a feeder of a copier 601. If user wants simple copy functionality, the user presses the copy button, the stack(s) are copied 602 and the workflow 600 ends. However, if the user wants to initiate a virtual press run, as described above, the user presses a visual assembly button 603 and continues to assembly, edit, format, review, visualize, etc. the document. Next, each page of the document stack is sequentially scanned and stored digitally internal to the copier 604. A visual representation of the document stack is then displayed on a GUI in the display of the copier 605. Preferably, all of the available publishing options explained above (i.e. simplex, N-up, staple, bind, hole-punching, etc.) as well as typical copier controls (i.e. lighter/dark, contrast, sharpness, background adjustment, color saturation, hue shift, etc.) are displayed in the GUI.

Next, the user selects/adjusts controls to get the document to the desired appearance 606 and presses a 'print' button 607. Finally, the saved document digital scans are processed according to user preference according to the selected preferences, and a final print job is printed, bound and delivered to the user 608.

Figure 7:
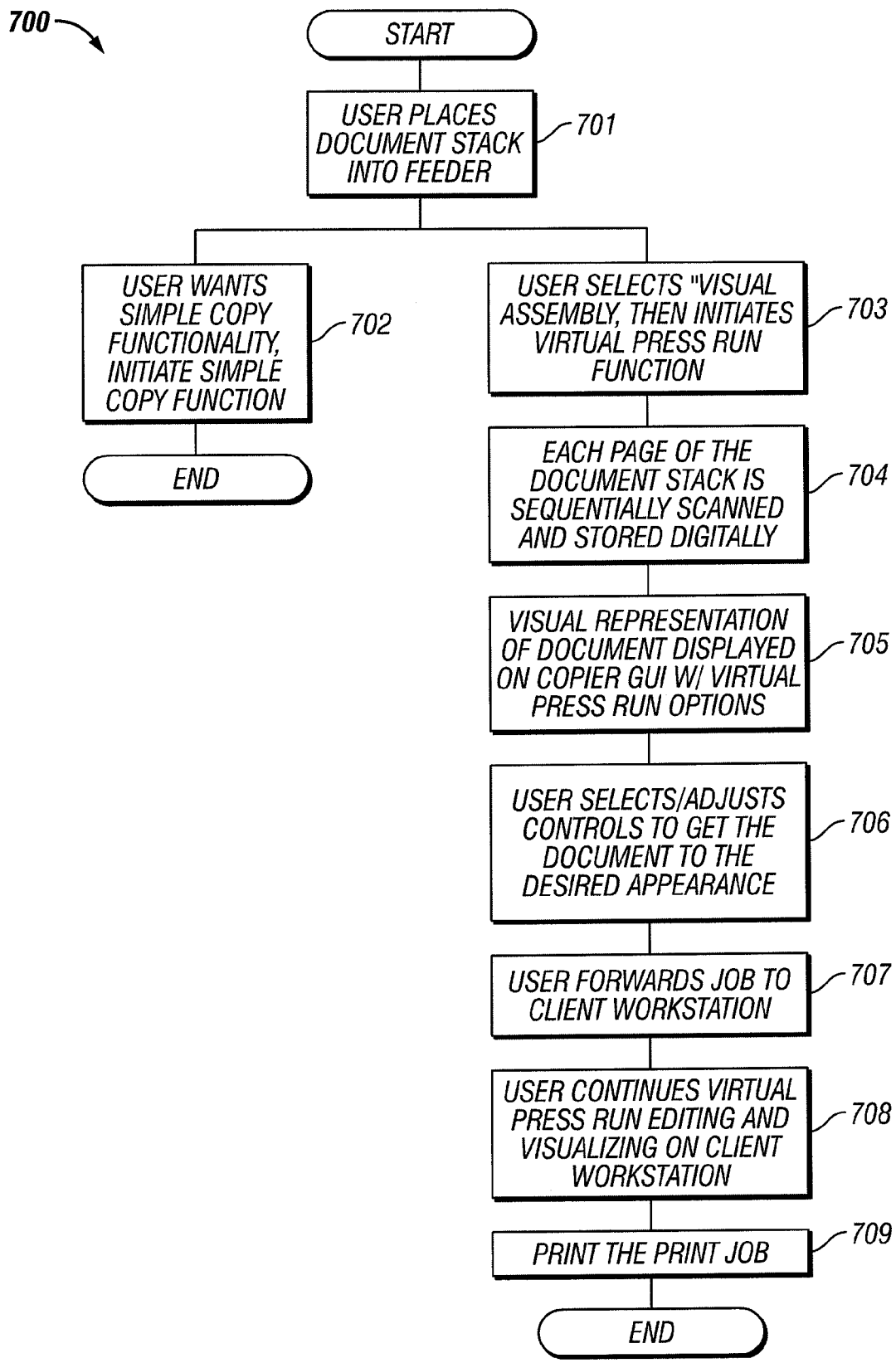
FIG. 7 illustrates an illustrative workflow for implementing a transferable print job session according to some embodiments of the invention.

In some other embodiments of the invention, print jobs are transported between peripheral devices or between peripheral devices and a client computer. According to these embodiments, the print job is created or scanned at a first device or computer, altered on at least a second device or computer and subsequently delivered to the user. FIG. 7 illustrates an illustrative workflow 700 for implementing a transferable print job visualization session according to some embodiments of the invention.

The workflow of FIG. 7 illustrates an illustrative workflow 700 for involving transferable print job visualization session according to some embodiments of the invention. According to FIG. 7, the workflow 700 begins with a user placing one or more document stack into a feeder of a copier 701. If user wants simple copy functionality, the user presses the copy button, the stack(s) are copied 702 and the workflow 700 ends. However, if the user wants to initiate a virtual press run, as described above, the user presses a visual assembly button 703 and continues to assembly, edit, format, review, visualize, etc. the document. Next, each page of the document stack is sequentially scanned and stored digitally internal to the copier 704. A visual representation of the document stack is then displayed on a GUI in the display of the copier 705. Preferably, all of the available publishing options explained above (i.e. simplex, N-up, staple, bind, hole-punching, etc.) as well as typical copier controls (i.e. lighter/dark, contrast, sharpness, background adjustment, color saturation, hue shift, etc.) are displayed in the GUI.

Next, the user forwards the job to their client workstation by sending the stored digital page representations and current formatting/adjustments in a format the client can display using the copier's visualization application 707. Next, the user continues to adjust, format and potentially merge additional source material into the job on the client workstation 708. Finally, when the user is satisfied, the user can select print from the client workstation for the job to be sent to the printer 709 and the workflow ends.

Figure 8:
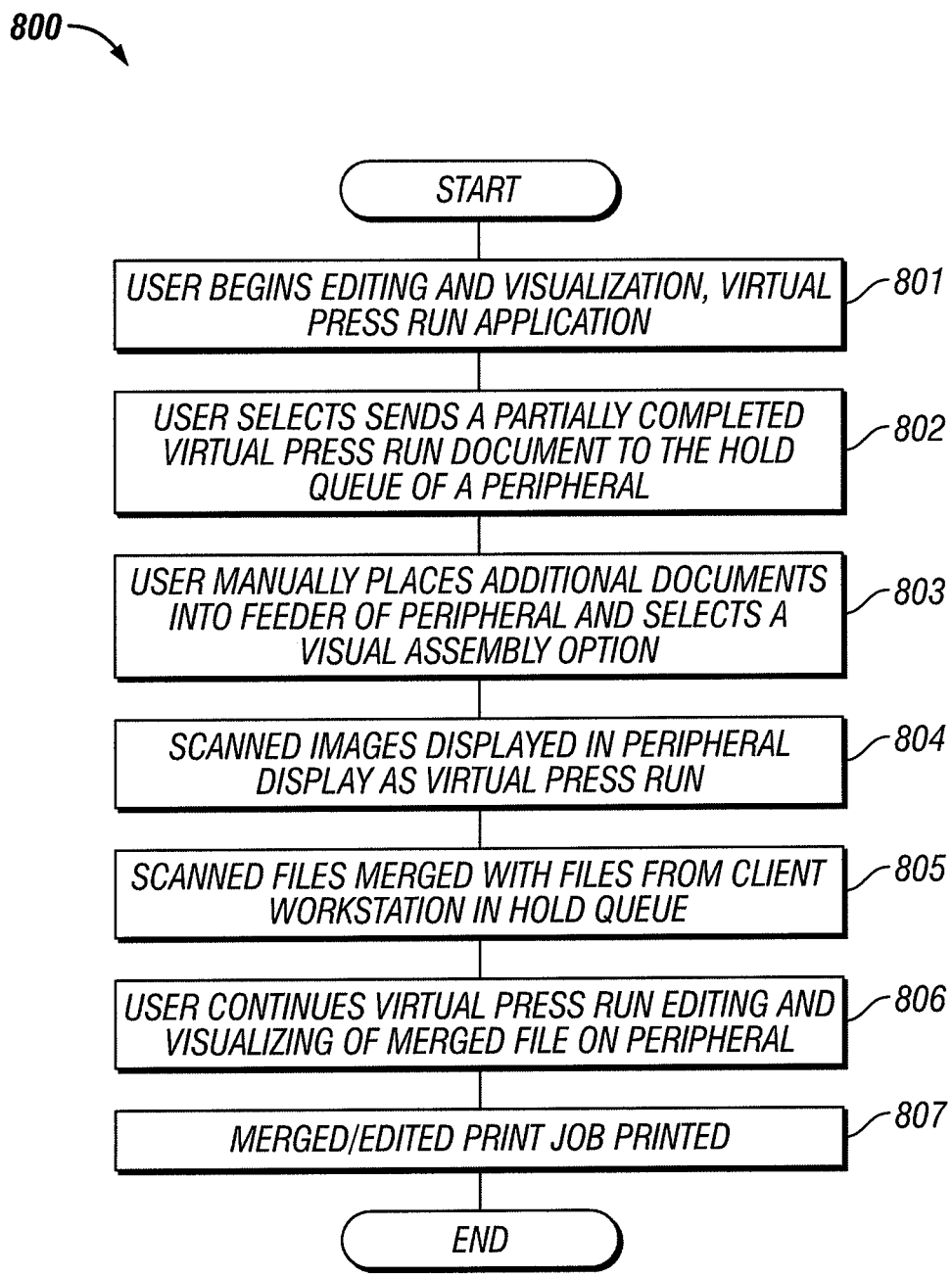
FIG. 8 illustrates an illustrative workflow for implementing a transferable print job visualization session beginning on a client workstation and finished on a peripheral device according to some embodiments of the invention.

In some other embodiments of the invention, the user can start from a virtual press run visualization session on their client workstation and finished on a peripheral device. According to these embodiments, different documents are collected and formatted as desired on a client workstation, wherein the documents include hardcopy pages to be included in the final formatted document set. However, according to these embodiments, rather than requiring these pages be scanned and sent back to the client workstation, the final assembly can be done at the copier. FIG. 8 illustrates an illustrative workflow 800 for implementing a transferable print job visualization session beginning on a client workstation and finished on a peripheral device according to some embodiments of the invention.

The workflow 800 of FIG. 8 begins with a user creating or accessing a file or group of files and editing and visualizing the files using a virtual press run application 801. Next, the user sends formatted jobs to the peripheral device's "hold" queue 802. The user then manually places additional documents into the feeder of the peripheral device 803. Next, the user selects a visual assembly, thereby causing the peripheral device to scan the additional documents 803. The scanned pages are displayed in the display of the peripheral device 804. Next, the user opens the "hold" queue document and the two documents are merged 805 in the same way that separate documents are merged on the client workstation. The user selects/adjusts controls to get the document to the desired appearance 806. Finally, a user then presses "print" and the merged document digital scans and original "hold queue" pages are processed according to user preference printed, optionally bound, optionally punched, and delivered to the user 807.

Specific Implementation Example

In the following example and explanation, an applet resides in Microsoft Office® applications. The applet directs users to a wizard workflow which guides them through choices or evokes virtual printer applications. The applet is referred to as the "Fiery MS Office Applet" or a "Rave Applet" and is designed to run on a Fiery® product host application, manufactured by Electronics for Imaging Inc., Foster City, Calif. It will be readily apparent to those with ordinary skill in the art having the benefit of this disclosure, that one or more similar applet could be used on a wide variety of host applications in a similar fashion, yielding similar results.

Installation

When Installing the Fiery MS Office Applet, user chooses which Workflow Wizards to install.

Registration of Fiery and User

The first time the Fiery MS Office Applet is launched, it checks to see if the applet is a registered Fiery® product. If it is not, the applet invokes an Automatic Fiery Discover subroutine and presents the user with a list of Fiery® products to choose from. When the user chooses a Fiery® product, the user is asked to fill out user information. The user information is transmitted to an EFI registration server, along with information about which Fiery® product was selected.

Once the Fiery is registered, the Fiery MS Office Applet identifies consumable content and finishing capabilities through bi-directional communication as explained above. The user subsequently can rediscover and change his Fiery® product selection. In these cases, the user is asked to register again the first time after he connects to another Fiery® product. If no Fiery® product is found on the system, the user is informed that the applet is to run in demo mode. A dummy Fiery® product is used that includes a "To Be Determined" tab, paper options, and finishing features. When the user submits their choices they are prompted to contact his copier sales representative to purchase a Fiery-driven MFP solution product. The software is also capable of installing customized messages.

Upgrades

A registered Rave applet checks the EFI upgrade server every time it is launched and checks for upgrades. If an upgrade is available, the server prompts the user to download and install the upgrade. After the upgrade is installed, the applet re-launches with the print job data previously selected.

Import from MS Office

In some embodiments or the invention, the Rave applets are launched from a Fiery Button or a Fiery Tab within Microsoft® Office Products, as explained above in FIG. 3A. Such third party plug-ins are supported in Microsoft Word, Excel, PowerPoint, Publish and Outlook. The users may also right-click a document file and choose Fiery Publish to open the document for visualizing, formatting, and printing, as explained above in FIG. 3B.

Preference Settings

In some embodiments, the Rave Applet is configured to accommodate various preferences setting. Selected settings include, but are not limited to:

Paper Setting Preferences

Paper Sizes, i.e. Letter, Legal, Tabloid, A3, A4, A5, etc.,

Page properties, i.e. Single-side vs. two-side printing, N-up, etc.,

Desktop Personalization

In some embodiments, the Applet is further configured to provide application personalization including: Desktop texture, personalized desk photos, and Custom Icon display, among other choices. In the case, of the custom icon display, the user chooses what Icons to display and what kind of Icon, i.e. button icons or objects like a stapler, a hole punch, etc.

Job Status Monitoring

In some embodiments, the Fiery publishing applet is further configured to show Fiery status graphically. For example, when the user rolls over the graphic with a mouse the applet shows a specific status message. The applet is also configured to install a desktop tray icon that will pop up a message if the job fails to print, along with the reason, i.e. out of paper, out of toner, etc.

Source File Content Changes

In some embodiments of the invention, the Rave applets only prepare 1-time print layout configurations and do not modify the source files. In some other embodiments, the Photo Enhancement applet, which, when invoked directly from the Microsoft® Office, push the corrected photos back into the source file.

Saved Data

In some embodiments of the invention, the Fiery Publish applet can save templates, but it does not permanently save a print session. If the user needs to reprint a job they must recreate it, possibly using a template to save effort. In some other embodiments, the Applet automatically saves the templates of the last N print jobs, identified by the document name. This is the scenario where a user can run back and quickly print the last job if a few more copies are needed.

Office Personalization Applet

In some embodiments of the invention, the Office Personalization Applet can be used as a separate application or as a subset to the Fiery Publish and Go To Meeting Applets. The Office Personalization Applet allows users to create simple jobs with variable data. As a standalone application, the user is prompted for the type of file to be output; business cards, photos, tent cards, badges etc. and then ask for the source file; Excel, Word or Outlook.

The Office Personalization Applet uses Avery® Labels as output templates. Once the layout options and the source content have been chosen, the user is guided to link the source file information to the layout with a simple, interactive workflow. The Office Personalization Applet also offers the ability to create covers and tabs with variable data as part of either the standalone application or as a subset of the other applications. It is desirable to offer a capability that allows the use of simple graphics and images as variable data.

Business Cards

In some embodiments of the invention, the user sees a business card layout, and using the Office Personalization Applet workflow, has the option to see one business card at a time, or the entire sheet. The user is then prompted to assign location of the variable data on the business cards using the workflow. This Applet uses Avery® Label templates/media for the creation of these prints.

Personalized Meeting Collateral

Some embodiments of the invention comprise a Go To Meeting workflow. According to these embodiments, the user can create ID Badges, Tent Cards, etc. to be included in meeting printouts. In some embodiments, the Applet uses Avery® Label templates/media for the creation of these prints.

Post Cards

Some embodiments of the invention comprise a post card template. Much like the Business card capability, the user can work on individual Post Cards or a sheet of Post Cards to assign personalized data. This Applet uses Avery Label templates/media for the creation of these prints.

Personalized Booklet Covers and Tab Fronts

In some embodiments of the invention, users can assign variable data to document covers and the fronts of tabs as a standalone application or as a subset of the Fiery® Publish and Go To Meeting Applets.

MS Office Mail Merge

In some embodiments of the invention, various mail templates are merged with Microsoft Office content to create mail products. The following are examples of this aspect of the invention:

Labels: Much like the Business card capability the user can work on individual labels or a sheet of labels to assign personalized data. This Applet uses Avery® Label templates/media for the creation of these prints.

Envelopes: Users can print individualized envelopes using interactive templates of standard envelopes sizes and styles.

Letters: Users can assign variable data to a template/background that can be used in letters. This is not intended to use variable data inside the content of the letter, and is intended to allow the simple creation and use of corporate letterhead that can be printed on demand and leveraging variable data for names, addresses and graphics.

PowerPoint (Master/Content)

In some embodiments, advantages of Microsoft® PowerPoint are optimized by identifying slide backgrounds as "Masters" and slide foregrounds as "Content." Offer personalization of PowerPoint meeting notes. In the preferred embodiment, this is configuration choice and is handled automatically by caching reoccurring images and reusing the cached image when applicable.

Color Branding Template Wizard

Some embodiments of the invention ensure that corporate branding colors are matched as closely as possible using a color space transform, as explained above. These embodiments are particularly useful when using Microsoft® Office applications.

In some embodiments of the invention, a Color Branding Template Wizard is offered to a user. Ideally, the Color Branding Template Wizard is an interactive tool that allows users to select colors in the thumbnails of a document with an "eyedropper" tool; and the assign spot and/or Pantone colors for output. Once colors have been identified and assigned, Fiery interprets and outputs the appropriate spot and/or Pantone color. The user is given the option to swap the color selected throughout the entire document or only on that specific page.

In other embodiments of the invention, a similar approach is used to create a standard template to be used in the Microsoft® Office applications by using Encapsulated PostScript as a way to lock the Spot and/or Pantone color in the EPS files that are then printed properly through the Fiery.

Fiery Publish Applet

In some embodiments, the Fiery Publish Applet is a 3D layout tool that permits the user to specify the layout of documents. In some embodiments, the user uses thumbnails of the actual pages to create a "what you see is what you get" picture of the actual output.

Requirements include:

The ability to step through the entire document, page by page.

The ability to use drop and drag mouse techniques to re-order the pages.

These order changes are only for printing purposes; the page order in the original document is unaffected.

Covers and tab sheets can be inserted throughout the document.

Tabs can be written via a simple text box that allows a limited number of characters and simple font selection and settings.

Tabs can also leverage the Personalization Applet to include variable data on the face of the tab including subject, project, etc.

Specific media selections can be made (colored sheets).

The layout work session can be saved and recalled later, as long as the original Office document has not been modified. Data saved in the session includes the original PDF generated from the Office Application, thumbnail bitmaps, basic layout template used, and any data reflecting layout exceptions (modifications).

Multiple documents (from an Office perspective) may be combined together into a single print job. The order of the documents may be changed and the order of individual pages within each document may be changed, but pages from each source document may not be shuffled together, across document lines. The combined documents are treated as a single print job within the Applet.

Multiple layout templates are available in the Applet. These are to be specified in a standard format within a text file. The intent is to read these templates so that the capabilities of the product are extended by adding more templates, not by re-coding the application. Examples of templates include booklet, 2-up simplex, 4-up, 2-up duplex, etc.

According to some embodiments, only one copy of the applet runs at a time. If a second is sent to the applet, the first document session is saved for recall. The saved session remains recallable until the original document is modified. If it has been modified, a new PDF document must be generated and the document session restarted in the applet. In some embodiments, multiple document sessions have multiple Tabs in the applet or multiple instantiations of the applet for each document.

Finishing options are displayed in the Applet as visually as possible. Hole punch locations, images of binding options and other finishing options are displayed in the layout. These options are modified wherever possible by using drop and drag techniques.

Available finishing options are constrained by the options on the Fierys that are in the user's network. These options should be cached so that the Applet does n of have to do Fiery discovery every time the Applet is started.

In some embodiments, if the Applet is running, files can be opened (and the currently opened file saved as a session, if desired) by dragging them from Windows explorer into the Applet.

In some embodiments, the Applet can be started as a standalone application, without first opening the Office application.

The Applet can be started by right-clicking on an Office file in a Windows Explorer window.

At the user's option the Applet can communicate back to the Office Application and reposition the document on a particular page. This is to assist in making corrections to the document. In these conditions, the Applet ends the session with the particular document.

The user has the option to save the layout that he has created as a new template for later use in another session.

At the end of the session, the user can request a print. The number of copies can be specified in the UI (default is 1). The resulting output is a PDF document with the logical document pages imposed on larger sheets and a <JDF/Fticket> job ticket for specific finishing options to be relayed to the Fiery.

Constraints based on the currently selected Fiery are used to limit choices in the Applet.

The resulting PDF file that is sent to the Fiery will be encrypted with a key derived from data embedded in the accompanying job ticket.

Tab/Blank Page Insertion

In some embodiments of the invention, tab and blank page insertion is done through a drop and drag mechanism. According to these embodiments, there is an icon on the desktop in the shape of a tab page. Rolling over the icon results in a brief pop-up of the available tab types. The user can grab one with the mouse and drag it to the layout page, where it is inserted.

The software automatically determines the number of tabs that are in use in the document and create a tab of the appropriate size and location on the tab sheet. One of the options of the tab icon is a blank page that does not have a tab. There is also a choice to automatically place tabs based on MS Word chapters and/or sections.

Page Re-Order

In some embodiments, page re-ordering is accomplished by dragging pages within the page thumbnail portion of the display. Multiple adjacent pages may be selected using the standard Windows shift-click and control-click mechanism. The selected pages can then be shifted en masse.

Pages can also be deleted from the print job by selecting and then pressing the delete key. The pages are deleted only from the final print job.

Binding

In some embodiments, document binding options are constrained by the Fiery that is currently selected. These are selectable from an icon that is displayed on the desktop. The user is shown graphic representations of the possible binding functions; spiral, perfect, etc. and then drags the graphic on top of the booklet to see how it would look with that type of binding.

Stapling

If stapling is available (based on the currently selected Fiery), a stapler icon is placed on the 3D desktop. Rolling over the stapler displays a brief pop-up of the stapling options available to the user. Clicking on the option results in a re-painting of the display to show how the document looks with the option.

If selecting stapling as an option invalidates a previously selected finishing option, then the previously selected option is removed from the display. If a conflict happens, the user is prompted with a message asking permission to change to new option and removing existing option.

Punching

If punching is available (based on the currently selected Fiery), a hole punch icon is placed on the 3D desktop. Rolling over the punch displays a brief pop-up of the punching options available to the user. Clicking on the option results in a re-painting of the display to show how the document looks with the option.

If selecting punch style as an option invalidates a previously selected finishing option, then the previously selected option is removed from the display. If a conflict happens, the user will be prompted with a message asking permission to change to new option and removing existing option.

Covers

In some embodiments, covers can be chosen from several sources including PDF files and from MS Office applications. The user has the option to store covers in a "Covers" folder from any of the MS Office applications. These covers are stored as PDF's created by the Microsoft PDF plugin.

Submitting to the Fiery

In some embodiments, the print jobs are submitted through Harmony calls to the Fiery Print Queue. If there is user authentication enabled on the Fiery, this authentication must be honored. If the user does not have permission to print to the Fiery a message is presented to the user.

Go To Meeting Applet

In some embodiments of the invention, a Go To Meeting Applet is used. The Go To Meeting Applet is an interactive Wizard utility that guides users through the kitting of meeting documents into a complete document that is ripped to one document and can be printed as one document. This Wizard is application dependant and assumes default print out from the MS Application that it is launched from. For example; PowerPoint users can choose the type of PowerPoint output; notes, handouts, etc. within the Wizard. In some embodiments, Go To Meeting applet requirements include:

"One Button" meeting document creator that works with all MS Office and PDF files;

Includes document preview;

Controls PowerPoint function for producing handout files including how many slide per page; and Automatically accesses Booklet Wizard to finalize booklet making Photo Enhancement Applet In some embodiments, the applet uses sophisticated algorithms to adjust photos automatically to achieve optimum results for users without expert photo enhancement skills. Automatic Photo Enhancement Wizard can be used as a standalone wizard or as a toolset available in the Fiery Publish Applet. Within the Fiery Publish Applet, the Photo Enhancement Applet allows the user to adjust single images one at a time, all of the images in the booklet at once or a specific set of images chosen by the user.

The Applet can also be invoked independently to automatically correct all the images within a selected document. In this instance, the corrected images are re-inserted into the source document. This saves the user from having to re-work the images each time they are printed.

According to these embodiments, the final workflow scenario that is supported appears to the user when a document is opened in the Fiery Publish or Go-to-Meeting Applet. Prior to opening the document in the layout editor, the user can correct the images in the document. In this case, the corrected images are re-inserted into the source document prior to conversion to PDF.

Automatic Adjustments

In some embodiments, a Photo Enhancement Wizard automatically adjusts most common image file formats including raw image files, TIFF, JPG, BMP and PNG with the following capabilities:

Automatic Balance

Remove Blue Cast

Remove Red Eye

Adjust Mid-tones

Enhance Colors

Enhance Details

Remove Hot Pixels

De-noise the image

Manual Adjustments

In some embodiments, users can make manual adjustment to single images, all of the images or a select set of images with the following tools:

Lossless Rotation;

Portrait De-Focus and/or enhancement Filter; and

Resize image using high quality filter.

GUI Look, Feel and Behavior

This section describes the behavior and requirements of the GUI:

The Applet preflights the document to determine if non-synthetic images are present. If none of the images are "natural", i.e. photographs, no processing occurs.

All non-synthetic images are extracted and automatically corrected. The resulting corrected images are displayed in thumbnail form for the user. Multiple page display are used to prevent the thumbnails from being displayed at too small a size to be useful.

Once all the images are corrected and displayed, the user can navigate through multiple pages of the thumbnail display.

Double-clicking or right-click or single-click and selection from a pull down menu results in a new display that allows the user to make adjustments to an individual image.

When an individual image is singled out, it is re-displayed in a new 9-up layout. The center image is the corrected image. The image directly to the left represents the image with a minus correction in one of the correction criteria. The image directly to the right represents the image with a "plus" correction in the same correction criteria as on the left. The image directly above the center image represents the image with a "minus" correction in other correction criteria. The image directly below the center image is the image with a plus correction in the same correction criteria as the image above the center image. The four corner images show the image as it would appear if corrected by the criteria of its two nearest neighboring images.

The center image may be selected for larger, more detailed display and potential correction. In this case, the image is displayed by itself and at a larger size. This permits operations such as manual re-eye correction or the other actions.

In this display mode, the user can drag one of the eight surrounding images into the center of the display. At this point, the selected copy of the image are then be displayed in 9-up and the eight surrounding image versions are based on this newly selected image.

The user can undo his selections until the original (the image that was in the original Office document) is displayed and can be used to print (or be in the source document).

Once the user has seen an image that he is happy with, he can select it and the previous thumbnail display of all the document's images are displayed. If the thumbnail display is multiple pages, then the user is placed back on the display page he had been on when he chose to drill down to fix an individual image.

Once happy with all the image corrections, the user can indicate that he is done and the images are either be re-inserted into the source document or corrected into the printable copy of the PDF file sent to the Fiery.

As will be understood by those familiar with the art, the invention may be embodied in other specific forms without departing from the spirit or essential characteristics thereof. Likewise, the particular naming and division of the members, features, attributes, and other aspects are not mandatory or significant, and the mechanisms that implement the invention or its features may have different names, divisions and/or formats. Accordingly, the disclosure of the invention is intended to be illustrative, but not limiting, of the scope of the invention, which is set forth in the following Claims.

The invention claimed is:

1. A computer apparatus, comprising:
a publishing module coupled to a processor, a memory, and a graphical user interface;
at least one content source coupled with the publishing module;
at least one visualization engine coupled with the publishing module; and
at least one printer coupled with the publishing module;
wherein the publishing modules further comprises:
a means for gathering content from the at least one content source;
a means for gathering visualization protocols from the at least one visualization engine;
a means for gathering printing protocols and printer capabilities from the at least one printer;
a means for merging the content, visualization protocols and printing protocol, forming merged data;
a means for receiving from a user a selection of one of a plurality of final layouts;
a means for automatically determining, based on the user selection of a particular final layout, a plurality of printer options from the printer capabilities gathered for the at least one printer, said printer capabilities supported by the at least one printer when printing a document using the user-selected particular final layout;
wherein the automatically determined plurality of printer options are presented to the user for selection;
wherein the plurality of final layouts includes at least a plurality of different booklet styles;
wherein each of the automatically determined plurality of printer options includes responding to a command that specifies one of a plurality of:
stapling location; hole punching; booklet binding; number of pages per sheet; number of printed sides per sheet; page orientation; image rotation; or image scaling;
a means for delivering the merged data to a user via the graphical user interface, an image of the merged data forming a virtual press run, wherein the virtual press run visualizes on the graphical user interface a three-dimensional display and a two-dimensional display adjacent to a plurality of document options, the three-dimensional display and the two-dimensional display visualize an identical N-UP format booklet that contains the content and conforms to the selected automatically determined plurality of printer options, where N is greater than 1; and
wherein, when a modification is made to one of the three-dimensional display and the two-dimensional display, the modification is reflected on the other of the three-dimensional display and the two-dimensional display;
means for forming a print job based on the virtual press run, wherein the user prints the virtual press run on the at least one printer, forming a printed document substantially identical to the virtual press run.

2. The computer apparatus of claim 1, wherein the at least one content source comprises a document production application and wherein the publishing module comprises an applet residing on the document production application.

3. The computer apparatus of claim 1, wherein the at least one content source comprises a document production application and wherein the publishing module comprises a servlet residing on a server coupled to the document production application.

4. The computer apparatus of claim 1, wherein the at least one content source comprises a document creation application chosen from among a word processor, a spreadsheet application, a presentation authoring program, a personal communication program, or programs for managing content in portable document format (pdf).

5. The computer apparatus of claim 1, wherein the at least one visualization engine is selected from among a two-dimensional visualization engine, a three-dimensional visualization engine, a flash engine, a JavaScript engine, and other web-based visualization engines.

6. The computer apparatus of claim 1, wherein the at least one visualization engine includes at least one template.

7. The computer apparatus of claim 6, wherein the at least one template is selected from among presentation slide templates, business card templates, photo templates, tent card templates, badge templates, label templates, post card templates, envelope templates, and correspondence templates.

8. The computer apparatus of claim 1, wherein the at least one content source is configured with a content Application Programming Interface (cAPI) and the means for gathering content from the at least one content source comprises providing one or more plug-ins that deliver content to the publishing module through the CAPI.

9. The computer apparatus of claim 1, wherein the at least one visualization engine is configured with a visualization Application Programming Interface (vAPI) and the means for gathering visualization protocols from the at least one visualization engine comprises providing one or more plug-ins that deliver content to the publishing module through the vAPI.

10. The computer apparatus of claim 9, wherein the visualization protocols comprise a Job Definition Format (JDF).

11. The computer apparatus of claim 1, wherein the at least one printer is configured with a printer Application Programming Interface (pAPI) and the means for gathering printing protocols from the at least one printer comprises providing one or more plug-ins that deliver content to the publishing module through the pAPI.

12. The computer apparatus of claim 11, wherein each printing protocol of the printing protocols is expressed as a PostScript file.

13. The computer apparatus according to claim 1, further comprising:
one or more image enhancement modules coupled to the publishing module for performing image enhancement tasks.

14. The computer apparatus according to claim 13, wherein the one or more image enhancement modules comprises a color space transform module, and wherein the color space transform module uses the gathered printer capabilities to determine how a visualized color appears in light of the gathered printer capabilities and adjusts the print job to best replicate the visualized color on the printer.

15. The computer apparatus according to claim 1, wherein the at least one printer is coupled to the publishing module remotely through a network.

16. A method of providing a virtual press run (VPR) for a document comprising:
establishing a VPR publishing applet on a host content production application; initiating a VPR session, the VPR session comprising:
gathering content from one or more content sources; gathering visualization tools from one or more editing sources; gathering printing options and printer capabilities from one or more printer; merging the content, visualization tools and printing options, forming merged data;
receiving from a user a selection of one of a plurality of final layouts; automatically determining, based on the user selection of a particular final layout, a plurality of printer options from the printer capabilities gathered for the at least one printer, said printer capabilities supported by the at least one printer when printing a document using the user selected particular final layout;
wherein the automatically determined plurality of printer options are presented to the user for selection;
wherein the plurality of final layouts includes at least a plurality of different booklet styles;
wherein each of the automatically determined plurality of printer options includes responding to a command that specifies one of a plurality of:
stapling location; hole punching; booklet binding; number of pages per sheet; number of printed sides per sheet; page orientation; image rotation; or image scaling;
displaying a virtual press run via a graphical user interface comprising an image of the merged data, wherein the virtual press run visualizes on the graphical user interface a three-dimensional display and a two-dimensional display adjacent to a plurality of document options, the three-dimensional display and the two-dimensional display visualize an identical N-UP format booklet that contains the content and conforms to the selected automatically determined plurality of printer options, where N is greater than 1; and
wherein, when a modification is made to one of the three-dimensional display and the two-dimensional display, the modification is reflected on the other of the three-dimensional display and the two-dimensional display;
forming a print job based on the virtual press run, the print job which when printed on the at least one printer, prints a document substantially identical to the virtual press run.

17. The method of providing a VPR according to claim 16, further comprising: caching an adjusted visualization in memory.

18. The method of providing a VPR according to claim 16, wherein initiating a VPR session further comprises clicking a VPR session button via a gateway in the host content production application.

19. The method of providing a VPR according to claim 16, wherein initiating a VPR session further comprises right-clicking a content file on a computer desktop using a mouse and choosing a VPR session option.

20. The method of providing a VPR according to claim 16, wherein the step of gathering content from one or more content sources further comprises adding a plug-in into the host content production application and accessing the plug-in through an Application Programming Interface (API) call.

21. A computer system for providing a virtual press run for content applications comprising:
a virtual press run (VPR) publishing applet coupled with a processor, a memory and a computer display;
one or more content applications having a plug-in for transferring content to the VPR publishing applet;
one or more visualization engines having a plug-in for providing visualization of the content to the VPR publishing applet;
one or more printers having a plug-in for providing printer capabilities to the VPR publishing applet;
a graphical user interface (GUI) configured to display dynamic content visualization on the computer display;
wherein the VPR publishing applet uses the one or more visualization engines to provide visualization of the content on the GUI; and
wherein the VPR publishing applet automatically determines, based on a user selection of a particular final layout selected from a plurality of final layouts, a plurality of printer options from the printer capabilities gathered for the at least one printer, said printer capabilities supported by the at least one printer when printing a document using the user selected particular final layout;
wherein the automatically determined plurality of printer options are presented to a user for selection;
wherein a plurality of final layouts includes at least a plurality of different booklet styles;
wherein each of the automatically determined plurality of printer options includes responding to a command that specifies one of a plurality of: stapling location; hole punching; booklet binding; number of pages per sheet; number of printed sides per sheet; page orientation; image rotation; or image scaling;
wherein the GUI is configured to display to the user a first virtual press run, wherein the first virtual press run visualizes on the graphical user interface a three-dimensional display and a two-dimensional display adjacent to a plurality of document options, the three-dimensional display and the two-dimensional display visualize an identical N-UP format booklet that contains the content and conforms to the selected automatically determined plurality of printer options, where N is greater than 1; and
wherein, when a modification is made to one of the three-dimensional display and the two-dimensional display, the modification is reflected on the other of the three-dimensional display and the two-dimensional display;
wherein the VPR publishing applet is configured to form a print job based on the first virtual press run, the print job which when printed on a printer of the one or more printers, prints a document substantially identical to the first virtual press run.

22. The computer architecture for providing a virtual press run according to claim 21, wherein the one or more content applications are chosen from among a word processor, a spreadsheet application, a presentation authoring program, a personal communication program, or programs for managing content in portable document format (pdf).

23. The computer architecture for providing a virtual press run according to claim 21, wherein the one or more visualization engines are selected from among two-dimensional visualization engines, three-dimensional visualization engines and flash visualization engines.

24. The computer architecture for providing a virtual press run according to claim 21, wherein the one or more visualization engines communicate with the VPR publishing applet in Job Definition Format.

25. The computer architecture for providing a virtual press run according to claim 21, wherein the one or more printers communicate with the VPR publishing applet in PostScript format.

26. The computer architecture for providing a virtual press run according to claim 21, further comprising:
one or more image enhancement modules coupled to the VPR publishing applet for performing image enhancement tasks.

27. The computer architecture for providing a virtual press run according to claim 26, wherein the one or more image enhancement modules comprises a color space transform module, and wherein the color space transform module uses gathered printer capabilities to determine how a visualized color appears in light of the gathered printer capabilities and adjusts the print job to best replicate the visualized color on the printer.

28. A computer apparatus, comprising:
a publishing module coupled to a processor, a memory, and a graphical user interface;
at least one content source coupled with the publishing module;
at least one visualization engine coupled with the publishing module; and wherein the publishing modules further comprises:
a means for gathering content from the at least one content source;
a means for gathering visualization protocols from the at least one visualization engine;
a means for gathering printing protocols and printer capabilities from at least one printer, said printer capabilities supported by the at least one printer when printing a document using a particular final layout selected by a user from a plurality of final layouts;
wherein the automatically determined plurality of printer options are presented to the user for selection;
wherein the plurality of final layouts includes at least a plurality of different booklet styles;
a means for merging the content, visualization protocols and printing protocol, forming merged data;
a means for delivering the merged data to a user via the graphical user interface, the image of the merged data forming a virtual press run, wherein the virtual press run visualizes on the graphical user interface a three-dimensional display and a two-dimensional display adjacent to a plurality of document options, the three-dimensional display and the two-dimensional display visualize an identical N-UP format booklet that contains the content and conforms to the selected automatically determined plurality of printer options, wherein N is greater than 1; and
wherein, when a modification is made to one of the three-dimensional display and the two-dimensional display the modification is reflected on the other of the three-dimensional display and the two-dimensional display; and
means for forming a print job based on the virtual press run, the print job which when printed on the at least one printer, prints a document substantially identical to the virtual press run.

29. The computer apparatus of claim 28, wherein the at least one content source comprises a document production application and wherein the publishing module comprises an applet residing on the document production application.

30. The computer apparatus of claim 28, wherein the at least one content source comprises a document production application and wherein the publishing module comprises a servlet residing on a server coupled to the document production application.

31. The computer apparatus of claim 28, wherein the at least one content source comprises a document creation application chosen from among a word processor, a spreadsheet application, a presentation authoring program, a personal communication program, or programs for managing content in portable document format (pdf).

32. The computer apparatus of claim 28, wherein the at least one visualization engine is selected from among a two-dimensional visualization engine, a three-dimensional visualization engine, a flash engine, a JavaScript engine, and other web-based visualization engines.

33. The computer apparatus of claim 28, wherein the at least one visualization engine includes at least one template.

34. The computer apparatus of claim 33, wherein the at least one template is selected from among presentation slide templates, business card templates, photo templates, tent card templates, badge templates, label templates, post card templates, envelope templates, and correspondence templates.

35. The computer apparatus of claim 28, wherein the at least one content production source is configured with a content Application Programming Interface (cAPI) and the means for gathering content from the at least one content production source comprises providing one or more plug-ins that deliver content to the publishing module through the CAPI.

36. The computer apparatus of claim 28, wherein the at least one visualization engine is configured with a visualization Application Programming Interface (vAPI) and the means for gathering visualization protocols from the at least one visualization engine comprises providing one or more plug-ins that deliver content to the publishing module through the vAPI.

37. The computer apparatus of claim 36, wherein the visualization protocols comprise a Job Definition Format (JDF).

38. The computer apparatus according to claim 28, further comprising:
one or more image enhancement modules coupled to the publishing module for performing image enhancement tasks.

39. The computer apparatus according to claim 38, wherein the one or more image enhancement modules comprises a color space transform module, and wherein the color space transform module uses the gathered printer capabilities to determine how a visualized color appears in light of the gathered printer capabilities and adjusts the print job to best replicate the visualized color on the printer.

40. The method of claim 16, further comprising:
receiving from the user changes to the content received from the at least one content source;
updating the at least one content source with the received user changes to the content.

* * * * *